US012253993B2

(12) United States Patent
 Maeno

(10) Patent No.: US 12,253,993 B2
(45) Date of Patent: Mar. 18, 2025

(54) DATA DIMENSIONALITY REDUCTION METHOD, COMPUTER PROGRAM, AND DATA DIMENSIONALITY REDUCTION DEVICE

(71) Applicant: UACJ CORPORATION, Tokyo (JP)

(72) Inventor: Ryota Maeno, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 18/573,981

(22) PCT Filed: Jun. 10, 2022

(86) PCT No.: PCT/JP2022/023422
§ 371 (c)(1),
(2) Date: Dec. 22, 2023

(87) PCT Pub. No.: WO2022/270332
PCT Pub. Date: Dec. 29, 2022

(65) Prior Publication Data
US 2024/0211457 A1    Jun. 27, 2024

(30) Foreign Application Priority Data

Jun. 23, 2021  (JP) ................................ 2021-103906

(51) Int. Cl.
 *G06F 16/00* (2019.01)
 *G06F 16/22* (2019.01)
 *G06F 16/23* (2019.01)

(52) U.S. Cl.
 CPC ...... *G06F 16/2264* (2019.01); *G06F 16/2237* (2019.01); *G06F 16/23* (2019.01)

(58) Field of Classification Search
 CPC ... G06F 16/2264; G06F 16/2237; G06F 16/23
 (Continued)

(56) References Cited

U.S. PATENT DOCUMENTS

| 11,157,781 B2 * | 10/2021 | Ding ................. G06F 18/23211 |
| 2016/0127405 A1 * | 5/2016 | Kasahara ............... G06N 3/045 |
| | | 726/23 |
| 2018/0121765 A1 | 5/2018 | Takimoto |

FOREIGN PATENT DOCUMENTS

| JP | 2011070503 A | 4/2011 |
| JP | 2013003861 A | 1/2013 |

(Continued)

OTHER PUBLICATIONS

International Search Report and Written Opinion (ISR-WO) corresponding to counterpart International Patent Application PCT/JP2022/023422 mailed Aug. 23, 2022, English translation.

*Primary Examiner* — Chelcie L Daye
(74) *Attorney, Agent, or Firm* — Renner, Otto, Boisselle & Sklar, LLP

(57) ABSTRACT

A data dimensionality reduction method includes: a step of dimensionally reducing a group of data from a high-dimensional space to a low-dimensional space using a distance function that defines a distance between any two vectors in the high-dimensional space; a step of dividing the dimensionally-reduced low-dimensional space into multiple subspaces; an analysis step of performing a regression analysis using a regression model based on at least one belonging data for each divided subspace; and a step of updating p first parameters included in the distance function based on results of the regression analysis in the multiple subspaces.

12 Claims, 20 Drawing Sheets

(58) Field of Classification Search
USPC .......................................................... 707/696
See application file for complete search history.

(56) References Cited

FOREIGN PATENT DOCUMENTS

| | | | |
|---|---|---|---|
| JP | 2018073293 | A | 5/2018 |
| JP | 2020128962 | A | 8/2020 |

* cited by examiner

HIGH-DIMENSIONAL
OBSERVED SPACE

DIMENSION
REDUCTION

2-DIMENSIONAL
LATENT SPACE

DATA DIMENSIONALITY REDUCTION METHOD, COMPUTER PROGRAM, AND DATA DIMENSIONALITY REDUCTION DEVICE

This application is a national phase of International Application No. PCT/JP2022/023422 filed Jun. 10, 2022, which claims priority to Japan Application No. 2021-103906 filed Jun. 23, 2021, each of which is hereby incorporated herein by reference in its entirety.

TECHNICAL FIELD

The present disclosure relates to a data dimensionality reduction method, a computer program and a data dimensionality reduction device.

BACKGROUND ART

In recent years, there have been various researches and developments utilizing machine learning such as deep learning. Machine learning is used in a wide variety of fields. For example, in the manufacturing industry, efforts have been made to apply machine learning techniques to design assistance or production planning assistance with the aim of developing novel materials and improving productivity, etc.

Before machine learning, it is common to perform a pre-process to multidimensional data to reduce dimension. Dimension reduction allows for data reduction for efficient machine learning or to visualize the distribution of data. Examples of dimension reduction include principal component analysis (PCA) or independent component analysis (ICA). If the units of physical quantity of the components that the individual data (elements) contain are different, a pre-process is performed to ensure that weights for variables used for dimension reduction are equivalent. Examples of the pre-process include subtracting the mean value from each variable to set the mean value to 0 (called "centering"), dividing each variable by the standard deviation to set the standard deviation to 1 (called "scaling"), or a combination of centering and scaling (called "auto-scaling").

Patent Document No. 1 discloses a method for dimension reduction of material parameters from a multidimensional space to a two-dimensional space. This dimension reduction allows the user to change the position of a data point corresponding to a material parameter in the two-dimensional coordinates. By performing a regression analysis based on the change information, the parameter importance for the material parameter is updated. Then, dimension reduction is re-applied to the multidimensional material parameter reflecting the position change of the data point by the user. It is stated that according to this method, it is possible to predict material properties while making use of the user's knowledge.

Patent Document No. 2 discloses a method for determining parameters for determining neighboring data in a local data distribution on a data-by-data basis based on distances between data included in a group of data subject to dimension reduction, and performing dimension reduction of the data based on the determined parameters. The distance information between at least some of the data in the group of data subject to dimension reduction can be input by the user. It is stated that according to this method, it is possible to realize desirable dimension reduction results that better reflect the intention of the user.

CITATION LIST

Patent Literature

Patent Document No. 1: Japanese Laid-Open Patent Publication No. 2020-128962
Patent Document No. 2: Japanese Laid-Open Patent Publication No. 2018-73293

SUMMARY OF INVENTION

Technical Problem

According to the methods disclosed in Patent Document Nos. 1 and 2, in order to obtain appropriate dimension reduction results, the user is required, after each dimensional reduction, to change the position of data points in the coordinate system after the dimension reduction and to input distance information between data. Such interactive exchanges may not only impose a load on the computing unit and the user, but may also increase the processing time.

The present invention has been made in view of this problem, and an object of the present invention is to provide a data dimensionality reduction method, a computer program and a data dimensionality reduction device, with which it is possible to realize a process for data reduction for efficient machine learning or for visualizing the distribution of data without requiring input from the user while preventing an increase in the load or processing time for the computing device, and without increasing the load or processing time to the computing device.

Solution to Problem

A dimension reduction method of the present disclosure is a method for dimensionally reducing a group of data each represented by an m-dimensional vector in an m-dimensional (m is an integer of 3 or more) high-dimensional space to an n-dimensional (n is an integer of 2 or more and less than m) low-dimensional space. In a non-limiting illustrative embodiment, the dimension reduction method includes: a reduction step of dimensionally reducing the group of data from the high-dimensional space to the low-dimensional space using a distance function that defines a distance between any two vectors in the high-dimensional space, wherein the distance function includes p (p is an integer of m or more) first parameters; a division step of dividing the dimensionally-reduced low-dimensional space into multiple subspaces; an analysis step of performing a regression analysis using a regression model based on at least one belonging data for each divided subspace, wherein the regression model is represented as a function of m explanatory variables and q (q is an integer of m or more) second parameters corresponding to the m explanatory variables; and an update step of updating the p first parameters included in the distance function based on results of the regression analysis in the multiple subspaces. The reduction step, the division step, the analysis step and the update step are repeatedly performed.

A computer program of the present disclosure is a computer program that can be executed on a computer for dimensionally reducing a group of data each represented by an m-dimensional vector in an m-dimensional (m is an integer of 3 or more) high-dimensional space to an n-dimensional (n is an integer of 2 or more and less than m) low-dimensional space. In a non-limiting illustrative embodiment, the computer program causes a computer to perform: a reduction step of dimensionally reducing the group of data from the high-dimensional space to the low-dimensional space using a distance function that defines a distance between any two vectors in the high-dimensional space, wherein the distance function includes p (p is an integer of m or more) first parameters; a division step of dividing the dimensionally-reduced low-dimensional space into multiple subspaces; an analysis step of performing a regression analysis using a regression model based on at least one belonging data for each divided subspace, wherein the regression model is represented as a function of m explanatory variables and q (q is an integer of m or more) second parameters corresponding to the m explanatory variables; and an update step of updating the p first parameters included in the distance function based on results of the regression analysis in the multiple subspaces, wherein the computer program causes the computer to repeatedly perform the reduction step, the division step, the analysis step and the update step in this order.

A data dimensionality reduction device of the present disclosure is a device for dimensionally reducing a group of data each represented by an m-dimensional vector in an m-dimensional (m is an integer of 3 or more) high-dimensional space to an n-dimensional (n is an integer of 2 or more and less than m) low-dimensional space. In a non-limiting illustrative embodiment, the data dimensionality reduction device includes: a processor; and a memory storing a program for controlling an operation of the processor. The processor performs, according to the a reduction step of dimensionally reducing the group of data from the high-dimensional space to the low-dimensional space using a distance function that defines a distance between any two vectors in the high-dimensional space, wherein the distance function includes p (p is an integer of m or more) first parameters; a division step of dividing the dimensionally-reduced low-dimensional space into multiple subspaces; an analysis step of performing a regression analysis using a regression model based on at least one belonging data for each divided subspace, wherein the regression model is represented as a function of m explanatory variables and q (q is an integer of m or more) second parameters corresponding to the m explanatory variables; and an update step of updating the p first parameters included in the distance function based on results of the regression analysis in the multiple subspaces, wherein the processor repeatedly performs the reduction step, the division step, the analysis step and the update step in this order.

Advantageous Effects of Invention

An illustrative embodiment of the present disclosure provides a data dimensionality reduction method, a computer program and a data dimensionality reduction device, with which it is possible to realize a process for data reduction for efficient machine learning or for visualizing the distribution of data.

DESCRIPTION OF EMBODIMENTS

The data dimensionality reduction method and data dimensionality reduction device according to an embodiment of the present disclosure will be described in detail below with reference to the accompanying drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand. Identical reference sings may be used to denote substantially the same configurations.

The following embodiment is illustrative, and the data dimensionality reduction method and the data dimensionality reduction device according to the present disclosure are not limited to the following embodiment. For example, the numerical values, shapes, materials, steps, and the order of steps, etc., to be shown in the following embodiment are merely examples, and various modifications can be made thereto so long as they do not lead to technical contradictions. One embodiment and another embodiment may be combined together, as long as it does not lead to technical contradictions.

[1. Data Dimensionality Reduction Device]

The data dimensionality reduction device according to the present embodiment is capable of dimension reduction of a group of data in a high-dimensional space of m dimensions (m is an integer of 3 or more) into a low-dimensional space of n dimensions (n is an integer of 2 or more and less than m). This data dimensionality reduction device is used to reduce the number of data dimensions from m to n. The data dimensionality reduction device typically includes a processor and a memory that stores a program to control the operation of the processor. Each data included in a group of data in a high-dimensional space is represented by an m-dimensional vector. The m-dimensional vector input to the data dimensionality reduction device is dimension-reduced to an n-dimensional vector. A dimension-reduced n-dimensional vector can be treated as input data for machine learning. The data dimensionality reduction device can be used, for example, to reduce data for efficient machine learning or to visualize the distribution of data.

Figure 1:
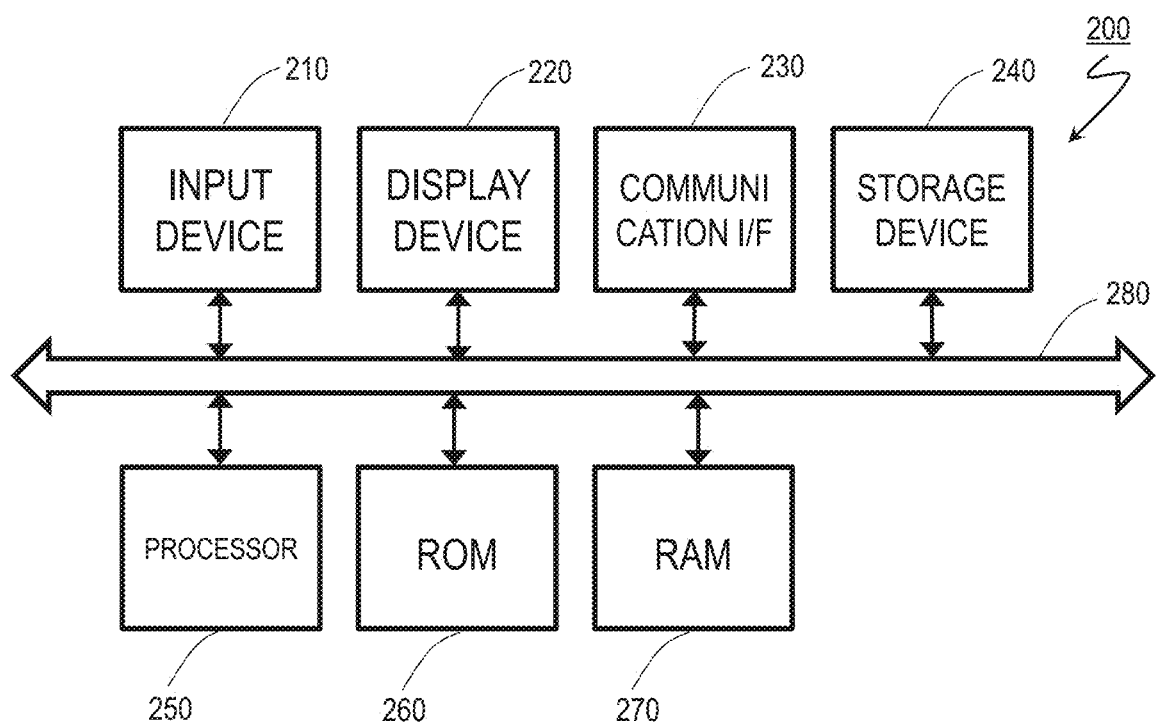
FIG. 1 is a block diagram showing an example hardware configuration of a data dimensionality reduction device according to an embodiment of the present disclosure.

FIG. 1 is a block diagram showing an example hardware configuration of a data dimensionality reduction device 200.

The data dimensionality reduction device 200 can, for example, access a huge amount of data (e.g., big data) stored in a database to obtain a group of data to be subject to dimension reduction. For example, when dimension reduction according to the present embodiment is applied to manufacturing of a steel material, the group of data to be input to the data dimensionality reduction device 200 may include manufacturing performance data such as manufacturing processes and manufacturing conditions, and information regarding material test results, etc.

The data dimensionality reduction device 200 includes, for example, an input device 210, a display device 220, a communication I/F 230, a storage device 240, a processor 250, a ROM (Read Only Memory) 260 and a RAM (Random Access Memory) 270. These components are connected so that they can communicate with one another via a bus 280.

The data dimensionality reduction device 200 can be realized as, for example, a personal computer (PC), a laptop computer, a tablet computer, or a server computer including a cloud server. A computer program, software or firmware containing a set of instructions for performing dimension reduction of data according to the present embodiment is implemented in the data dimensionality reduction device 200. Such a computer program can be recorded on a computer-readable storage medium, such as, for example, an optical disc, sold as packaged software, or provided via the Internet.

The input device 210 is a device for converting instructions from the user into data to be input into the computer. The input device 210 is, for example, a keyboard, a mouse, or a touch panel.

The display device 220 is, for example, a liquid crystal display or an organic EL display. The display device 220 can, for example, display an image visualizing the distribution of a group of data in the dimensionally-reduced low-dimensional space. The visualization of a group of data will be described below.

The communication I/F 230 is, for example, an interface for data communication between the data dimensionality reduction device 200 and a database or for communication between the data dimensionality reduction device 200 and a server computer or another personal computer. The form and protocol are not limited, as long as data can be transferred. For example, the communication I/F 230 allows wired communication compliant with USB, IEEE1394 (registered trademark), or Ethernet (registered trademark). The communication I/F 230 allows wireless communication compliant with the Bluetooth (registered trademark) standard and/or the Wi-Fi standard. These standards include a wireless communication standard that uses the 2.4 GHz or 5.0 GHZ frequency band.

The storage device 240 is, for example, a magnetic storage device, an optical storage device, a semiconductor storage device, or a combination thereof. Examples of the optical storage device include optical disk drives or magneto-optical disk (MD) drives. Examples of the magnetic storage device include hard disk drives (HDD), floppy disk (FD) drives, and magnetic tape recorders. Examples of the semiconductor storage device include solid-state drives (SSD).

The processor 250 is a semiconductor integrated circuit, and is also referred to as a central processing unit (CPU) or microprocessor. The processor 250 sequentially executes a computer program that is stored in the ROM 260 and that includes a set of instructions for dimension reduction of data, to achieve a desired process.

The processor 250 in the present embodiment is configured to repeatedly execute the reduction step, the division step, the analysis step and the update step to be described below in this order according to the computer program.

The data dimensionality reduction device 200 may include, in addition to or instead of the processor 250, an FPGA (Field Programmable Gate Array) including a CPU, a GPU (Graphics Processing Unit), an ASIC (Application Specific Integrated Circuit), an Application Specific Standard Product (ASSP), or a combination of two or more circuits selected from among these circuits.

The ROM 260 is, for example, a writable memory (e.g., a PROM), a rewritable memory (e.g., a flash memory), or a read-only memory. The ROM 260 stores a program that controls operations of the processor. The ROM 260 may not necessarily be a single storage medium, or may be a set of storage media. A portion of the set of storage media may be removable.

The RAM 270 provides a work area into which the control program stored in the ROM 260 will be temporarily loaded during boot-up. The RAM 270 may not necessarily be a single storage medium, and may be a set of storage media.

[2. Dimension Reduction Method]

Figure 2:
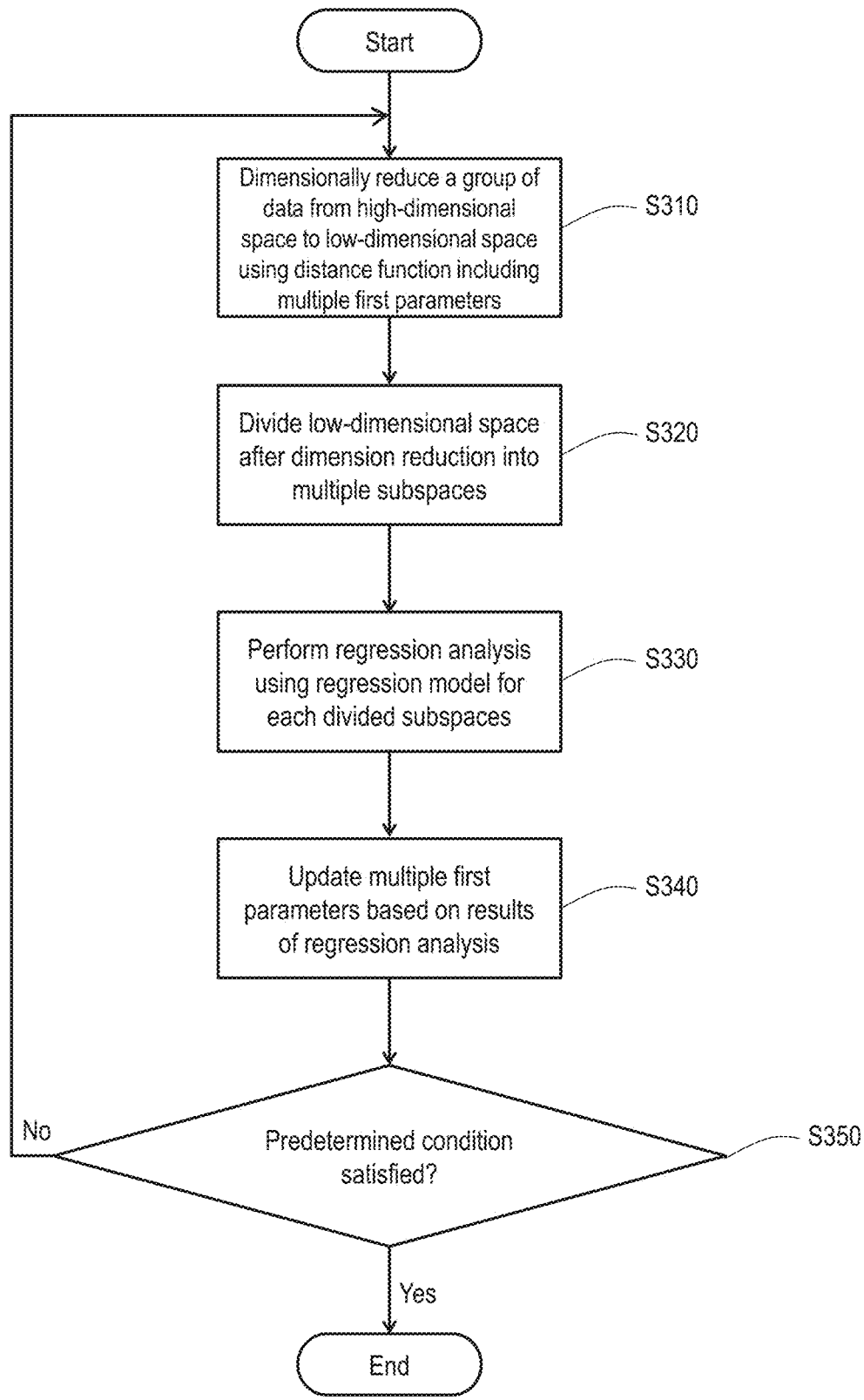
FIG. 2 is a flow chart illustrating a process procedure of a dimension reduction method according to an embodiment of the present disclosure.

FIG. 2 is a flow chart illustrating a process procedure of a dimension reduction method according to the present embodiment.

The dimension reduction method of the present embodiment includes a reduction step S310, a division step S320, an analysis step S330, an update step S340 and a determination step S350. The dimension reduction method can be implemented, for example, in the data dimensionality reduction device 200 described above. Typically, the process (or the task) included in each step is described in a computer program in units of software modules. Note however that if an FPGA, or the like, is used, all or some of the series of processes may be implemented as a hardware accelerator. In the following description, the entity that executes each process is the processor 250 of the data dimensionality reduction device 200.

(Reduction Step S310)

The processor 250 dimensionally reduces a group of data from a high-dimensional space to a low-dimensional space using a distance function that specifies the distance between any two vectors in the high-dimensional space. The distance function contains p first parameters. The number p of first parameters in the present embodiment is equal to the number of dimensions m of the high-dimensional space. Note however that p may be an integer greater than or equal to m, e.g., 2 m or 3 m.

As a method of dimension reduction, algorithms such as self-organizing map, kernel principal component analysis (Kernel PCA), GTM (generative topographic map) or t-SNE (t-Distributed Stochastic Neighbor Embedding), etc., may be used. In the present embodiment, self-organizing map is applied for dimension reduction.

The distance function in the present embodiment is represented by a weighted Euclidean distance. In this case, the integer p is equal to the integer m. The p (i.e., m) first parameters are m weight coefficients that weigh the distance between the m components of an m-dimensional vector between any two vectors. Note however that the distance function forming the distance space is not limited to the weighted Euclidean distance, but can be represented, for example, by the Manhattan distance, or a more generalized k-squared mean distance, Chebyshev distance, etc.

The m-dimensional vector in the present embodiment may include, as its components, the chemical composition and/or manufacturing conditions of the alloy material. The m-dimensional vector may include, as its components, for example, the chemical composition and/or manufacturing conditions of the aluminum alloy. The manufacturing conditions may include manufacturing conditions associated with the rolled material of the aluminum alloy.

Figure 3:
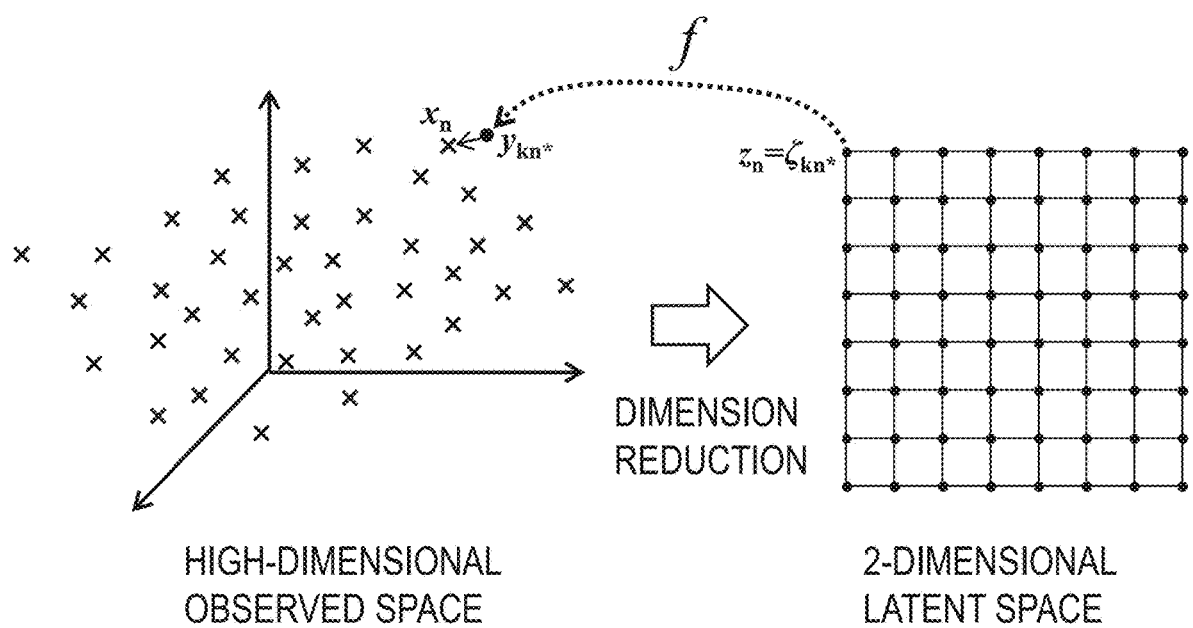
FIG. 3 is a diagram illustrating the concept of a self-organizing map (SOM).

FIG. 3 is a diagram illustrating the concept of a self-organizing map. Hereafter, the self-organizing map will be described as SOM. SOM is a type of neural network. SOM is a dimension reduction method that maps a data set in a high-dimensional space to a low-dimensional space while preserving the topological structure of the data distribution. Hereinafter, the high-dimensional space may be referred to as "observed space", the low-dimensional space as "latent space", and data in the observed space as "observed data". In SOM, the distance between data is defined for each observed data having high-dimensional information. Learning is performed so that data whose distance is short in the observed space are also arranged close to each other in the latent space.

Below are some mathematical definitions. First, consider an m-dimensional observed space X=(Rm, d) and a corresponding 2-dimensional latent space Z=([0,1]$^2$, d$_z$). The continuous monojective mapping from the latent space to the observed space is described as f:Z→X. In the present embodiment, the latent space is a 2-dimensional space for ease of discussion of dimensionally-reduced data. Note however that the latent space may be a 3-dimensional or higher-dimensional space.

Denote each observed data n as $x_n$ and define the data set containing a group of observed data as $X_L=(X_1, X_2, \ldots, X_N)$. $X_n$ is an m-dimensional vector. Also define, for any two elements, the distance d:R$^m$xR$^m$→R between the elements (m-dimensional vector) on the observed space X. There is no limitation for this definition as long as it satisfies the axioms of distance, but the distance function in the present embodiment is expressed by the mathematical formula of Expression 1 based on the most general Euclidean norm.

[Expression 1]

$$\forall x_a, x_b \in X, d(x_a, x_b) = \\ \sqrt{(x_a - x_b)\text{diag}(w_1, w_2, \ldots, w_m)^2(x_a - x_b)^T}$$ [Exp. 1]

where w=[$w_1$, $w_2$, . . . , $w_m$] is the weight or weight coefficient for the distance of each component of the vector. The distance expressed by Expression 1 is called the weighted Euclidean distance. The details of the weight w will be described below.

Next, the coordinates of each node k in the latent space are represented by $\zeta_k$. The coordinates as transferred to the observed space, $y_k$=f ($\zeta_k$), will be referred to as the reference vector. The purpose of SOM is to update $y_k$ in the observed space corresponding to each of all nodes k in the latent space so that the distribution of $X_L$ is well accounted for. With these mathematical definitions, it is possible to design a continuous monojective map f.

The learning methods of SOM include online learning methods or batch learning methods. The present embodiment employs a batch learning method, which is considered to be relatively less prone to bias in learning because learning can be done in a realistic computational time in an offline environment.

The algorithm of the batch learning method will be outlined below.

(1) The node $k_n$* in the latent space that corresponding to the reference vector $y_{kn}$* that is closest in distance to each observed vector $x_n$ is called the winner node. The winner node is obtained for all observed data n. The coordinates in the latent space corresponding to the observed data n are expressed by $z_n=\zeta_{kn}$*.

(2) Calculate the amount of learning that each winner node distributes to its neighbor node k. A neighborhood function is used to calculate the amount of learning so that the closer a node is to the winner node $k_n$* in the latent space, the greater the amount of learning to be closer to $x_n$ in the observed space. The neighborhood function can be expressed, for example, as a Gaussian function shown in the mathematical formula of Expression 2. Here, σ is the neighborhood radius.

[Expression 2]

$$R_{kn} = \exp\left(-\frac{1}{2\sigma^2}\|z_n - \zeta_k\|^2\right)$$ [Exp. 2]

(3) All reference vectors are updated so that they become weighted mean shown in the mathematical formula of Expression 3.

[Expression 3]

$$y_k = \frac{\sum_{n=1}^{N} R_{kn} x_n}{\sum_{n=1}^{N} R_{kn}}$$ [Exp. 3]

Repeat the processes (1) to (3) while updating the neighborhood radius $\sigma$, until learning converges.

(Division Step S320)

The processor 250 divides the dimensionally-reduced low-dimensional space into multiple subspaces.

(Analysis Step S330)

The processor 250 may perform a regression analysis using a regression model based on at least one belonging data for each divided subspace. The regression model is represented as a function of m explanatory variables and q second parameters corresponding to the m explanatory variables. Here, q is an integer greater than or equal to m. The regression model in the present embodiment is a linear multiple regression model (formula). In this case, the integer q is equal to the integer m. Each of the q (i.e., m) second parameters is m partial regression coefficients. Note however that a nonlinear regression model can also be used in the analysis step. In the present embodiment, p=q=m holds, but the relationship between p, q and m is not limited to this.

The processor 250 performs a linear multiple regression analysis based on at least one belonging data for each divided subspace. The processor 250 calculates the update parameter based on the absolute values of the m partial regression coefficients obtained from the linear multiple regression analysis.

(Update Step S340)

The processor 250 updates the p first parameters included in the distance function based on the results of the regression analysis in the multiple subspaces. In other words, the processor 250 updates the p first parameters using the update parameter. The weight coefficient of the weighted Euclidean distance in the present embodiment is updated based on the results of the linear multiple regression analysis.

(Determination Step S350)

The processor 250 determines whether the result of dimension reduction satisfies a predetermined condition. The processor 250 terminates the process of dimension reduction when it is determined that the result of dimension reduction satisfies the predetermined condition (yes in S350). When the processor 250 determines that the result of dimension reduction does not satisfy the predetermined condition (no in S350), the process returns to the process of the reduction step S310 again, and repeats the reduction step S310, the division step S320, the analysis step S330 and the update step S340 until the result of dimension reduction satisfies the predetermined condition.

The predetermined condition in the present embodiment is a specified number of iterations. Note however that the predetermined condition is not limited to this. For example, each time a series of processes of the reduction step S310, the division step S320, the analysis step S330 and the update step S340 is completed, a visualization map visualizing the classification result of dimensionally-reduced data can be displayed on the display device. The user may check the visualization map each time to determine whether to terminate the dimension reduction process. Thus, the termination condition can be input to the dimension reduction device by the user via the input device during the execution of dimension reduction.

In the distance function shown in the formula of Expression 1 above, the influence of the weight coefficient is very significant. Take, for example, the manufacturing process of an aluminum alloy. This manufacturing process may include hot rolling. A group of observed data containing multiple manufacture data (or manufacture parameters), which can be a factor characterizing the deformation resistance in hot rolling, can be subject to dimension reduction. In such a case, for example, the units of physical quantity are different between a composition ratio of 1% and a temperature of 1° C. of a chemical component Mg. Even if the units are the same, for example, the degree of influence on the deformation resistance can be different between a component ratio of 1% of Mg and a component ratio of 1% of Fe. Therefore, it is common to apply autoscaling to the learning data set containing the input data used for machine learning, and to perform a normalization pre-process such that the mean is 0 and the variance is 1 for each component of the element in the observed space. However, because the variance of the input data is not directly related to the importance of the component of the element, applying a pre-process such as autoscaling does not correctly represent the similarity between data that are originally desired to be obtained.

The present inventor conceived an algorithm (hereinafter referred to also as "weight update algorithm") for dimension reduction in which an objective variable g for each data is set in advance and the weight coefficients are adjusted so that the explanatory variable with a greater influence on the objective variable g also has a greater weight coefficient for that variable. For example, the deformation resistance can be set as the objective variable g while using the manufacture data for hot rolling of an aluminum alloy described above as the explanatory variable. Alternatively, for example, the friction state of a tool during processing in a hot finishing rolling mill may be set as the objective variable g, and what is derived from an equation that takes into account both deformation resistance and friction state may be set as the objective variable g. Thus, the objective variable g can be set freely depending on the purpose of machine learning (or dimension reduction).

The following is an example implementation of dimension reduction, taking the case of applying the weight update algorithm to the manufacture of an aluminum alloy as an example. The present implementation example applies SOM for dimension reduction and employs weighted Euclidean distance as the distance function. Note however that the weight update algorithm can be applied to machine learning in general, and in particular, it can be used in data reduction for efficient machine learning, or in visualization of data distribution.

[3. Implementation Example of Dimension Reduction]

Figure 4:
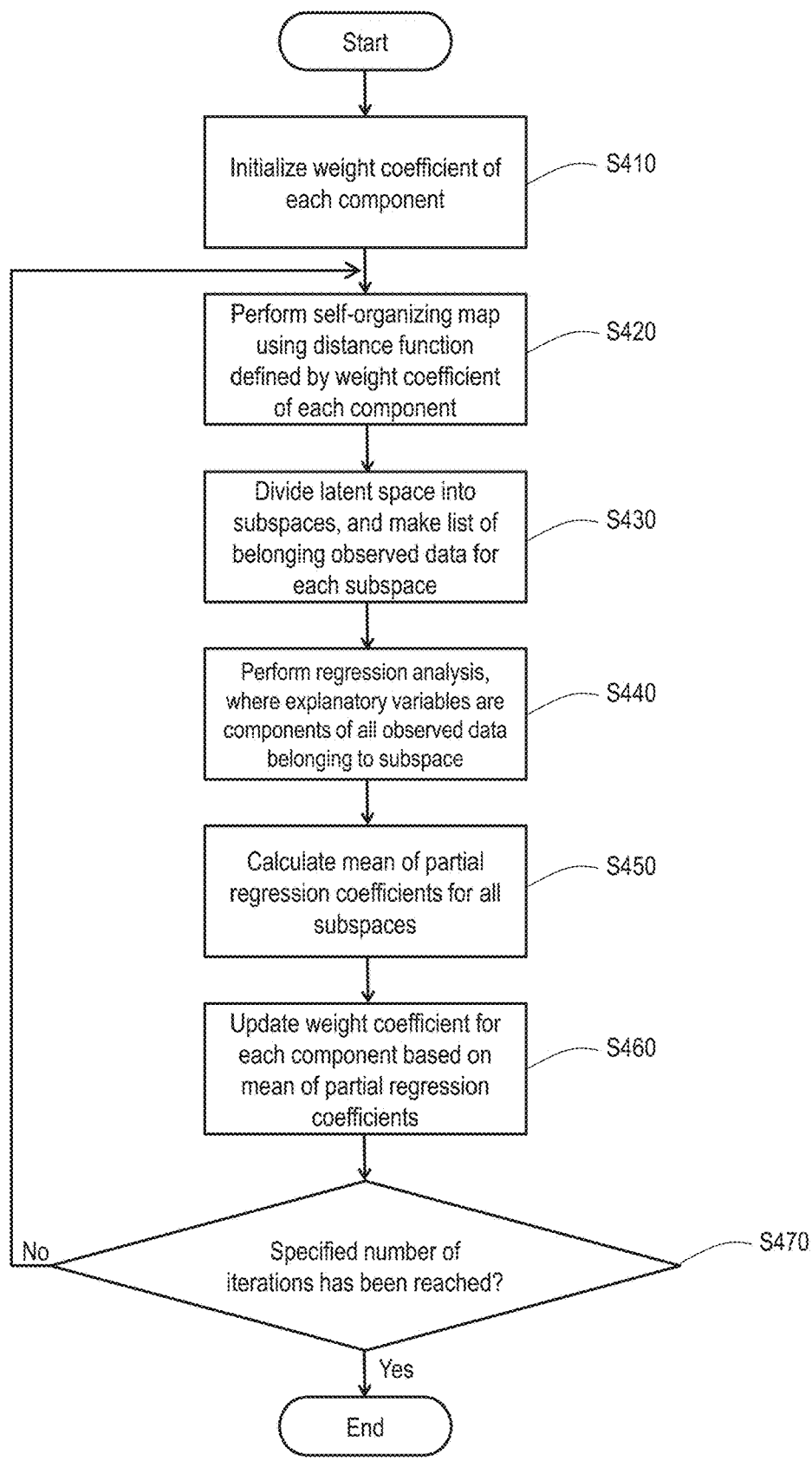
FIG. 4 is a flow chart illustrating a process procedure according to an example implementation of dimension reduction.

FIG. 4 is a flow chart illustrating a process procedure according to an example implementation of dimension reduction.

(Step S410)

First, the processor 250 initializes the weight coefficient for each component. Specifically, the processor 250 initializes weight coefficient $w=[w_1, w_2, \ldots, w_m]$ for each component of an element in the group of data in the observed space. The weight coefficient $w=[w_1, w_2, \ldots, w_m]$ can be initialized, for example, by setting 1/standard deviation for each coefficient.

(Step S420)

The processor 250 performs SOM using the distance function defined by the weight coefficients of the components. The processor 250 performs SOM using the distance function (i.e., weighted Euclidean distance) expressed by the formula of Expression 1.

(Step S430)

Figure 5:
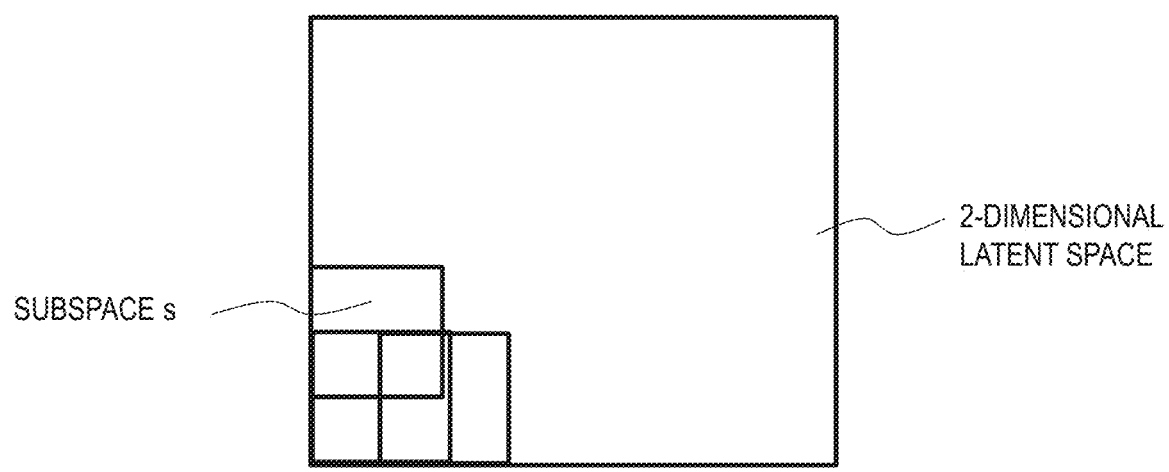
FIG. 5 is a diagram schematically showing a latent space divided into multiple subspaces.

FIG. 5 is a diagram schematically showing a latent space divided into multiple subspaces. Although FIG. 5 shows only some of the multiple subspaces, in reality, the subspaces are arranged repeatedly in the latent space.

The processor 250 divides the latent space into multiple subspaces, as illustrated in FIG. 5, and makes a list of belonging observed data for each subspace. Herein, "data n belongs to subspace s" is defined to mean the eventual winner node of observed data n is in subspace s in the latent space. Let S be a set of subspaces and Ks be a set of nodes within subspace s in the latent space, then a set of data numbers belonging to s is expressed by the formula of Expression 4.

[Expression 4]

$$\forall s \in S, D_s = \{n | \exists k \in K_s [k = k_n^*]\} \quad [\text{Exp. 4}]$$

(Step S440)

The processor 250 performs a linear multiple regression analysis, where explanatory variables (parameters) are components of all observed data belonging to the subspace. Although it is desirable to perform the regression analysis using a model with a nonlinear relationship to the parameters, a linear approximation can be performed with subspaces. The regression model used for linear multiple regression analysis in each subspace is expressed by the formula of Expression 5. Here, g is the objective variable and $x_i$ (i=1, 2, 3, ... ) is the explanatory variable. The $a_i$ corresponding to the explanatory variable $x_i$ and b are the partial regression coefficients. Note that b is a constant term.

[Expression 5]

$$g = b + a1 \times x1 + a2 \times +x2 + a3 \times x3 + \ldots$$

Note however that in determining whether a linear multiple regression analysis is possible, only those subspaces that satisfy the following conditions (1) and (2) are considered to be targets.

(1) The number of observed data belonging to the target subspace s, $N_s=|D_s|$, is greater than m+1. (2) $X_s^T X_s$ is regular for the data matrix represented by the formula of Expression 6, which is required for the linear multiple regression analysis for $D_s=\{n_1, n_2, \ldots, n_{Ns}\}$.

[Expression 5]

$$X_s' = [x_{n1}^T, x_{n2}^T, \ldots, x_{n_{Ns}}^T]^T \quad [\text{Exp. 6}]$$

[Expression 6]

$$X_s = [1, X_s'] \quad [\text{Exp. 7}]$$

Let $S_A$ be the subset of S satisfying the conditions (1) and (2) above.

(Step S450)

The processor 250 calculates the mean value of the partial regression coefficients for all subspaces. However, in order to take into consideration the reliability of the regression calculation, the processor 250 calculates the mean value of the partial regression coefficients after performing processes (I) and (II) described below for each subspace. Herein, $a_{s,c}$ is the partial regression coefficient for component C calculated in the linear multiple regression analysis in subspace s, and $SE_{s,c}$ is the standard error.

(I) Only data for which the inverse of the standard error $SE_{s,c}$ exceeds the specified $t_{min}$ is the target. The processor 250 determines that the regression is reliable if the standard error is sufficiently small.

(II) The processor 250 determines whether the sign of the partial regression coefficient is correct. If the sign is correct, the processor 250 obtains the absolute value of the partial regression coefficient, and if the sign is incorrect, the processor 250 obtains 0 as the partial regression coefficient. The rule for determining the correct sign for each component is determined in advance, and the processor 250 sets $sgn_c$ in the formula of Expression 9 to +1 or −1 according to that rule. If the rule cannot be predetermined, that is, if both a positive correlation and a negative correlation are possible for g, the processor 250 can set $sgn_c$ to +1 when a≥0 and switch $sgn_c$ to −1 when a<0, as the same sign as a, so that it is possible to determine that the sign is always correct.

The mean of the regression coefficients for each component c can be obtained from the formulas of Expressions 8 and 9. Herein, $A_c$ is a set of partial regression coefficients for component c that satisfy condition (I), and $a_c$ is the mean of the regression coefficients. Note that in the present implementation example, the standard error is used to determine the reliability of the partial regression coefficient but, needless to say, the t value or the p value may be used to determine the reliability.

[Expression 7]

$$A_c = \{a_{s,c} | s \in S_A, 1/SE_{s,c} \geq t_{min}\} \quad [\text{Exp. 8}]$$

[Expression 8]

$$a_c = \frac{\sum_{a \in A_c} \max\{sgn_c a, 0\}}{|A_c|} \quad [\text{Exp. 9}]$$

(Step S460)

The processor 250 updates the weight coefficient $w_c$ for each component c based on the mean of the partial regression coefficients. The processor 250 updates the weight coefficient $w_c$ to $w_c^{new}$ based on the formula of Expression 10, for example. Here, $a_{max}$ is the upper limit of $a_c$, and $a_{min}$ is the lower limit of $a_c$.

[Expression 9]

$$w_c^{new} = \begin{cases} w_c a_c, & a_{min} \leq a_c \leq a_{max} \\ w_c a_{max}, & a_c > a_{max} \\ w_c a_{min}, & a_c < a_{min} \end{cases} \quad [\text{Exp. 10}]$$

(Step S470)

The processor 250 determines whether the number of times of updating the weight coefficient has reached the specified number of times $N_f$. If the number of updates has reached the number of times $N_f$, the processor 250 terminates the dimension reduction process. If the number of times of update has not reached the number of times $N_f$, the processor 250 returns to the process of step S420 and updates the weight coefficient by repeatedly performing steps S420 to S460 until the number of times of update reaches the number of times $N_f$.

While linear multiple regression analysis is performed for subspaces in the present implementation example, other types of regression calculation may be employed. For example, if accuracy is improved by approximating the objective variable to be proportional to the exponent of the explanatory variable corresponding to each component, the exponent may be employed as a parameter in the regression calculation. In this case, the regression calculation is a nonlinear regression calculation. Any method may be selected as long as such a regression calculation is performed on all subspaces and the updating of parameters in the distance function can be repeatedly performed based on the result.

According to the present embodiment, there is no particular need for a process, such as autoscaling, which is generally performed as a pre-process in machine learning. The problem of the difference in the units of physical quantity of components is eliminated, and it is possible to apply dimension reduction while taking into consideration the degree of influence of each component, i.e., each explanatory variable, on the objective variable. There is no need for interactive exchange with previous users, which may improve the user convenience. Note however that if the units of physical quantity of components are different, a process such as autoscaling may be applied to normalize each component before executing the weight update algorithm.

[4. Simulation Result]

The weight update algorithm described above was applied to the process of hot rolling of aluminum alloys in an attempt to perform dimension reduction for a group of data containing multiple manufacture data (or manufacture parameters) that characterize the deformation resistance. The multiple manufacture parameters include seven parameters corresponding to % by mass of the five alloy components (Si, Fe, Cu, Mg and Mn), the rolling condition (rolled material temperature))(° C., and the logarithmic strain. The linear multiple regression model with the deformation resistance in each subspace as the objective variable is represented by the formula of Expression 11.

[Expression 11]

Deformation resistance (g) =
$b + \alpha 1 \times$ Si quantity $+ \alpha 2 \times$ Fe quantity $+ \alpha 3 \times$ Cu quantity $+ \alpha 4 \times$ Mg quantity $+ \alpha 5 \times$ Mn quantity $+ \alpha 6 \times$ temperature $+ \alpha 7 \times$ strain The observed space is a 7-dimensional space and the observed data is represented by a 7-dimensional vector. The latent space is a 2-dimensional space. The weighted Euclidean distance includes 7 weight coefficients. The linear multiple regression model is represented by 7 explanatory variables, 7 partial regression coefficients corresponding to the 7 explanatory variables, and a constant term b. 10,000 observed data were generated from the multiple manufacture parameters that characterize the deformation resistance included in the actual manufacture data for 10,000 coils.

In this simulation, SOM was applied to a set of observed data including 10,000 7-dimensional data. The neighborhood radius was expressed by the formula of Expression 12. The neighborhood radius, expressed by Expression 12, decreases as the number of iterations increases. Here, $\sigma_0$ is the initial value, $\sigma_{min}$ is the lower limit, $\tau$ is a parameter that determines the speed of neighborhood radius reduction, and t is the number of iterations used in the SOM algorithm.

[Expression 10]

$$\sigma = \max\{\sigma_0 \exp(-t/\tau), \sigma_{min}\} \qquad \text{[Exp. 12]}$$

Regarding SOM initialization, the SOM algorithm is generally executed with the result of dimension reduction by PCA as the initial value. Note however that when the weight update is sufficiently advanced, that is, after the change of weight per iteration becomes small, it is considered that the observed data can be more appropriately classified by taking over, as it is, the reference vector updated in the previous reduction process as the initial value. Therefore, when the number of iterations is less than Np, the result of PCA is used for initialization, and when the number of iterations is equal to or greater than Np, the final value of the previous iteration is taken over.

(SOM Simulation Conditions)

The coordinate system of latent space: $[-1,1]^2$; the number of nodes in latent space: 900 (30×30); the initial value $\sigma_0$: 1.0; the lower limit $\sigma_{min}$: 0.2; $\tau$: 10, the number of iterations in SOM: 20

(Simulation Conditions for Weight Update Algorithm) Subspace size: 7×7 (nodes); the distance between subspaces: 3 (nodes); $t_{min}$: 3; $a_{min}$: 1/1.2; $a_{max}$: 1.2; the number of iterations $N_f$: 40; $N_p$: 25

Comparative Example

Figure 6A:
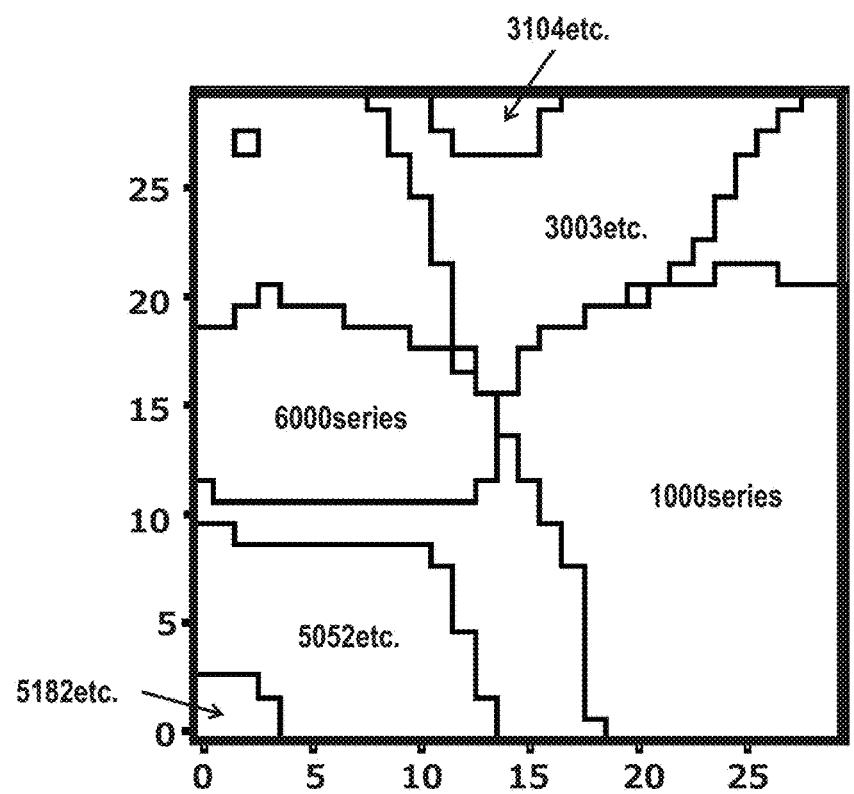
FIG. 6A is a diagram showing a simulation result of SOM according to a comparative example.
Figure 6B:
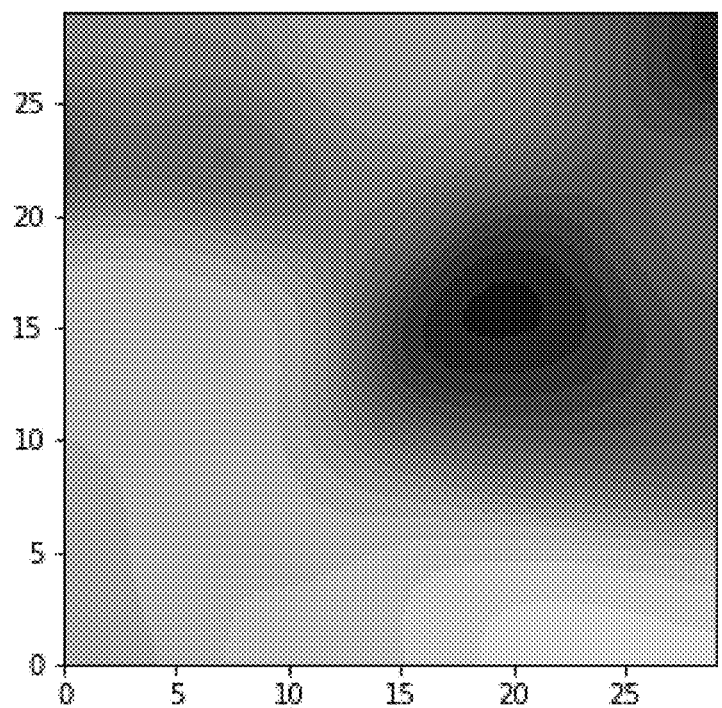
FIG. 6B is a diagram showing a simulation result of SOM according to the comparative example.
Figure 6C:
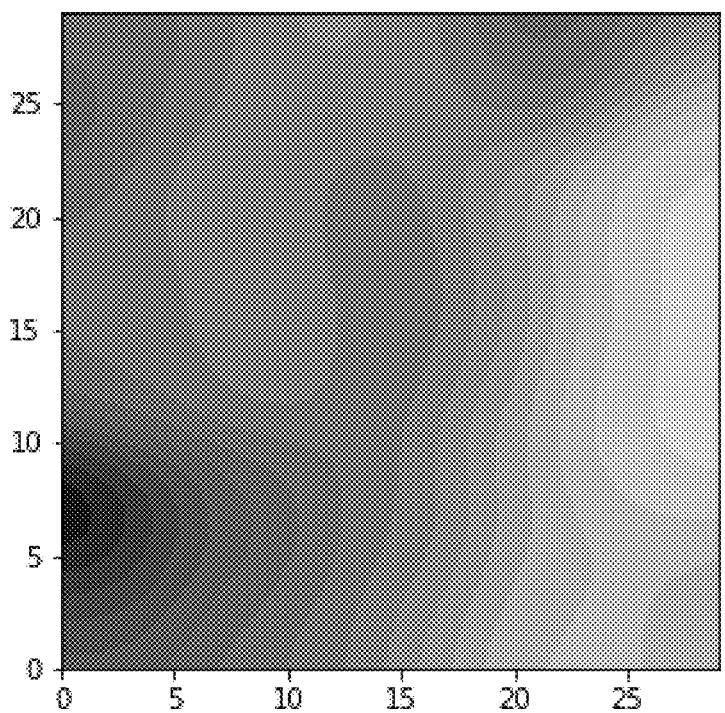
FIG. 6C is a diagram showing a simulation result of SOM according to the comparative example.

The results of SOM were studied, where only autoscaling, which is generally performed as a pre-process of machine learning, is applied without applying the weight update algorithm according to the present embodiment. FIG. 6A to FIG. 6C show the simulation results of SOM according to the comparative example. Since it is difficult to display all five alloy components (Si, Fe, Cu, Mg and Mn), FIG. 6A shows a visualization map of alloy classification obtained by visualizing the results of labeling based on the combination of % by mass of the components. FIG. 6B shows the contour lines of rolled material temperature, and FIG. 6C shows the contour lines of log strain. Here, in each of the visualization map and the contour map, the vertical axis and the horizontal axis indicate the indexes (IDX) corresponding to the 30×30 node.

The formula of Expression 1 where the inverse of the unbiased standard deviation of each component is simply set as the weight was defined as the distance function, so that it is possible to obtain the same results as when normalization is performed. The latent space was divided into subspaces, and the mean value of the partial regression coefficient for each component was calculated. The mean values of the partial regression coefficients were 0.45, 0.53, 1.93, 2.10, 7.31, 1.25 and 1.75 respectively for Si, Fe, Cu, Mn, Mg, log strain and temperature.

As shown in FIG. 6A, the 1000 series and the 5000 series, which should be arranged most diagonal from each other as deformation resistance, are arranged adjacent to each other, and instead the 3000 series and the 5000 series are arranged diagonal from each other. This is because normalization of the weight results in the weight of Mg being underestimated, as understood from the fact that the value of Mg (7.31) is larger than other components in terms of the average value of the partial regression coefficients. It can be seen from the comparative example that the distance between the 5000 series, which has a high Mg content, and the 1000 series, which is a pure aluminum series, is not accurately represented.

Example

The results of SOM were studied, where autoscaling, which is generally performed as a pre-process of machine learning, is not applied, and instead, the weight update algorithm according to the present embodiment is applied. Although it is originally desirable to normalize the initial value of the weight, in this example, the initial weight value was set to 1 for all components with the intention of clearly showing the effect of the weight update algorithm.

Figure 7A:
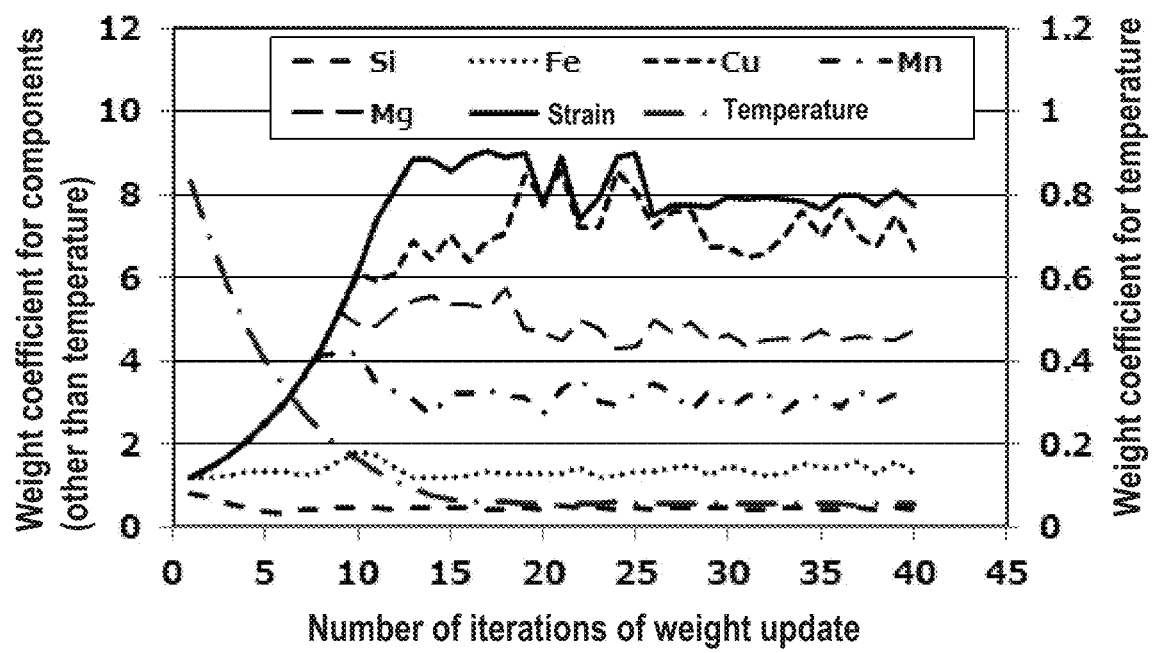
FIG. 7A is a graph showing the change in weight coefficients of components versus the number of iterations of weight updates.
Figure 7B:
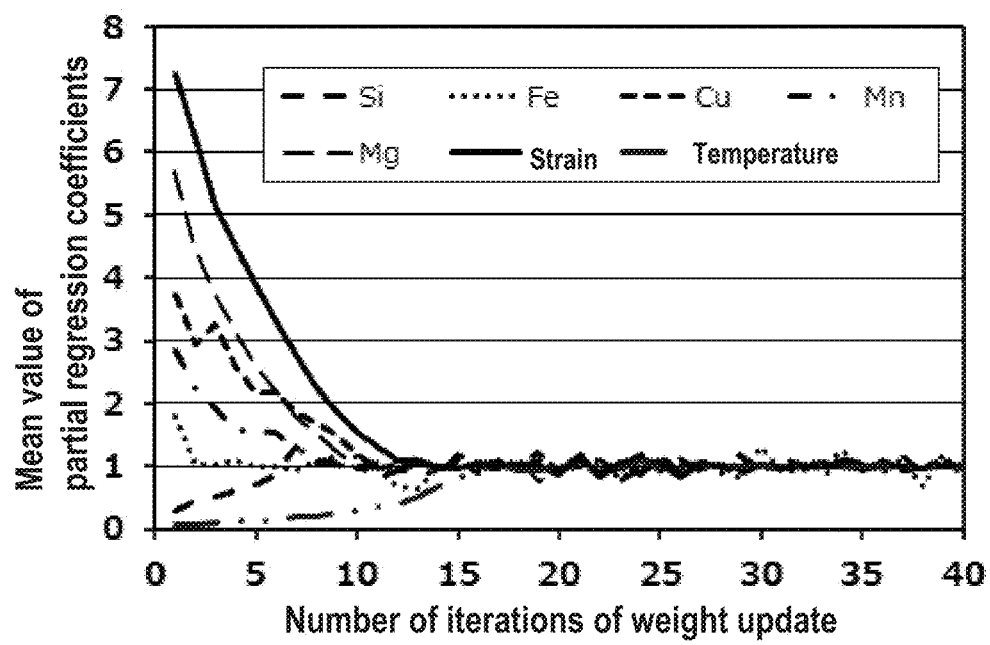
FIG. 7B is a graph showing the change in mean values of partial regression coefficients versus the number of iterations of weight updates.
Figure 8A:
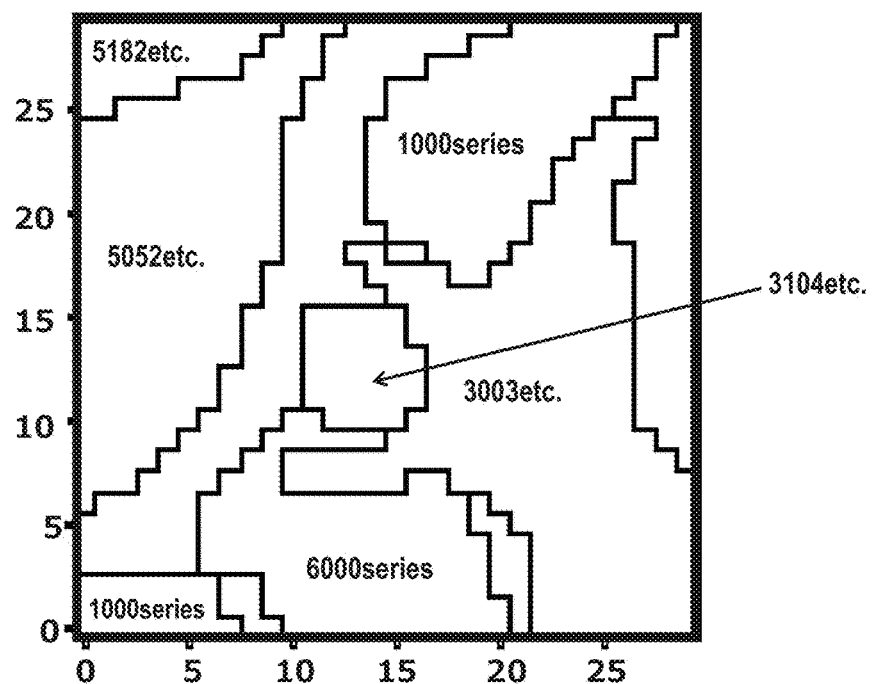
FIG. 8A is a diagram showing a visualization map of alloy classifications when the number of iterations is 0.
Figure 8B:
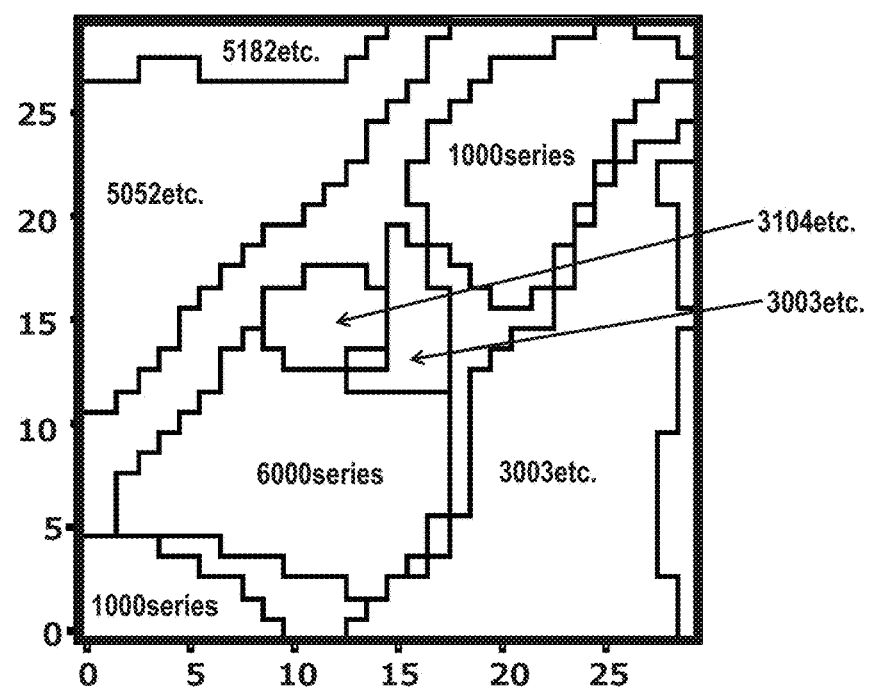
FIG. 8B is a diagram showing a visualization map of alloy classifications when the number of iterations is 5.
Figure 8C:
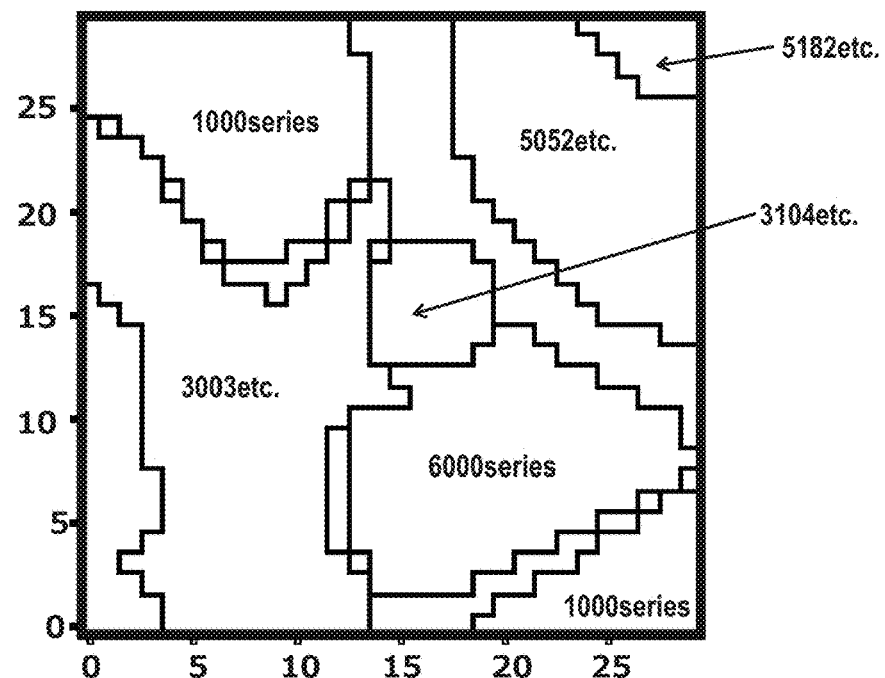
FIG. 8C is a diagram showing a visualization map of alloy classifications when the number of iterations is 10.
Figure 8D:
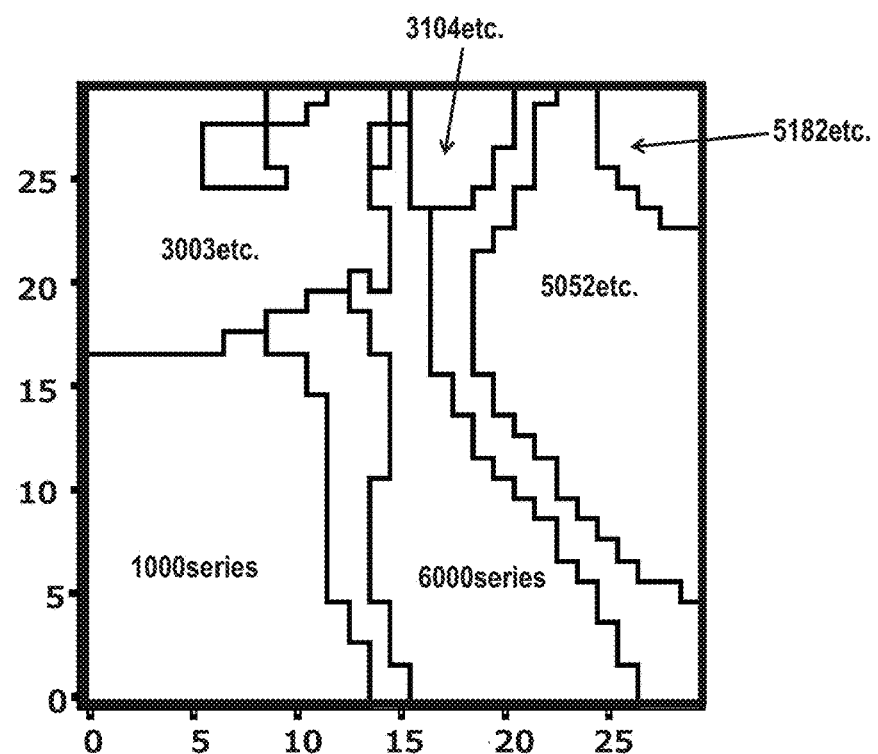
FIG. 8D is a diagram showing a visualization map of alloy classifications when the number of iterations is 20.
Figure 8E:
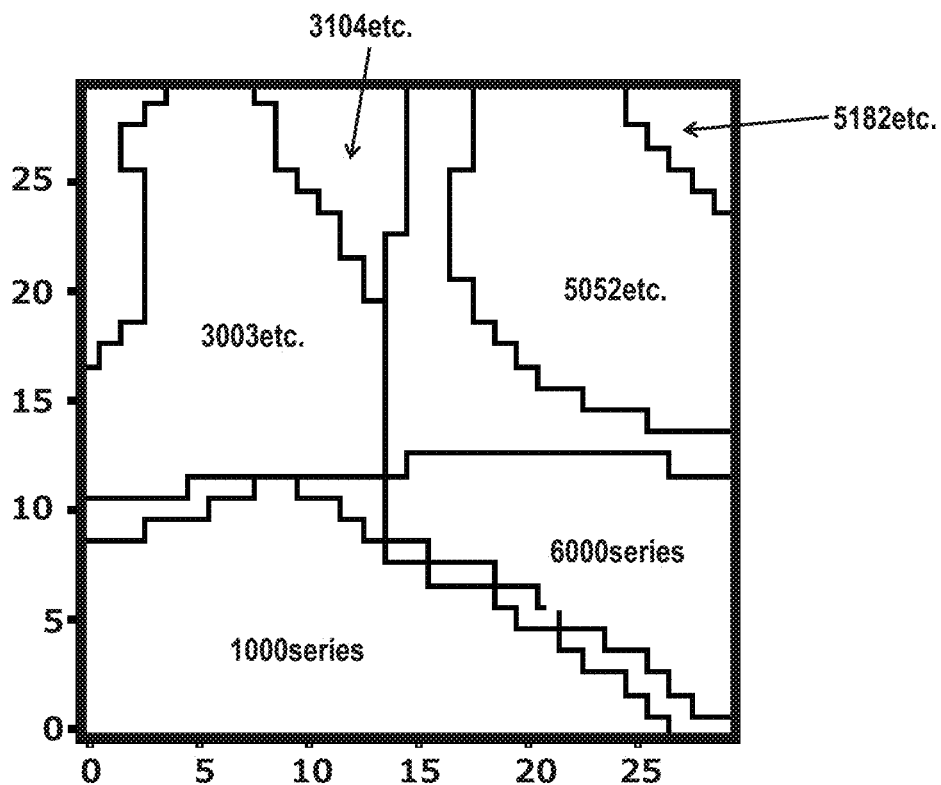
FIG. 8E is a diagram showing a visualization map of alloy classifications when the number of iterations is 40.

The number of iterations $N_f$ was set to 40, and the weight coefficient was updated a total of 40 times according to the process procedure illustrated in FIG. 4. FIG. 7A is a graph showing the change in the weight coefficient of each component, i.e., the transition in the weight coefficient, versus the number of iterations of weight update. FIG. 7B is a graph showing the change in the mean value of each partial regression coefficient versus the number of iterations of weight update. The horizontal axis in FIG. 7A and FIG. 7B indicates the number of iterations of weight update. The vertical axis on the right side of the graph in FIG. 7A shows the weight coefficient for the temperature component, and the vertical axis on the left side of the graph shows the weight coefficient for components other than temperature, i.e., % by mass of Si, Fe, Cu, Mg and Mn and the log strain component. The vertical axis in FIG. 7B shows the mean value of the partial regression coefficient for each component.

It can be seen from the result of transition of weight coefficient shown in FIG. 7A that the weight coefficient for each component converges to a certain value after 40 iterations of weight update. Furthermore, it can be seen from the transition of the weight coefficient shown in FIG. 7A and the change in the mean value of each partial regression coefficient shown in FIG. 7B that the weight coefficients are updated so that the influence coefficient (or mean) comes close to 1 in subspaces of the latent space. Note however that this is the mean of the influence coefficients in subspaces and does not represent the macroscopic magnitude of the influence. It can be seen from the result of the graph shown in FIG. 7B that the mean value of the partial regression coefficients generally converges to 1.

FIG. 8A to FIG. 8E show visualization maps of alloy classification where the number of iterations is 0, 5, 10, 20 and 40. FIG. 9A to FIG. 9E show contours of rolled material temperature where the number of iterations is 0, 5, 10, 20 and 40. FIG. 10A to FIG. 10E show contours of logarithmic strain where the number of iterations is 0, 5, 10, 20 and 40.

Where the number of iterations is 0, the 1000 series are arranged diagonally apart from each other. The 1000 series and the 5000 series are arranged close to each other. The influence of temperature is overestimated, resulting in alloys being classified almost solely on the factor of temperature. These problems are due to the large influence of the difference in the units of physical quantity between 1° C. of temperature and 1% by mass of alloy component.

Figure 9A:
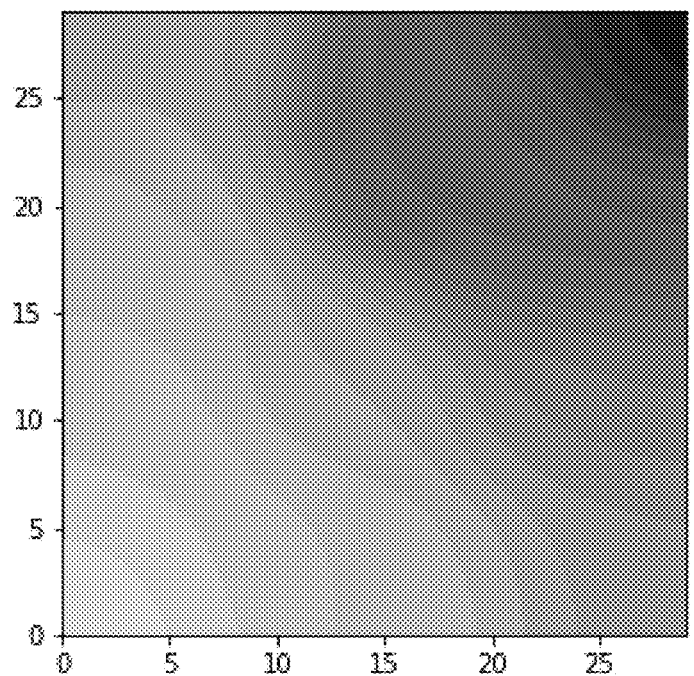
FIG. 9A is a diagram showing contour lines of rolled material temperature when the number of iterations is 0.
Figure 9B:
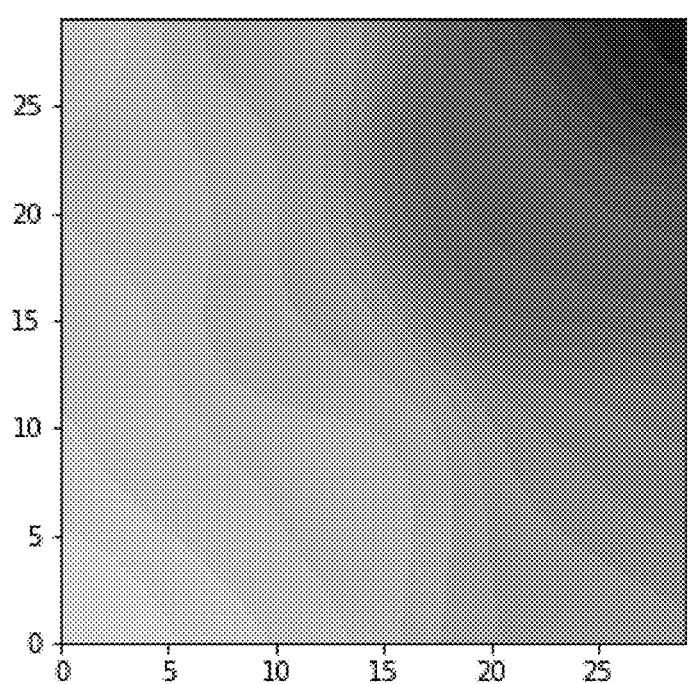
FIG. 9B is a diagram showing contour lines of rolled material temperature when the number of iterations is 5.
Figure 9C:
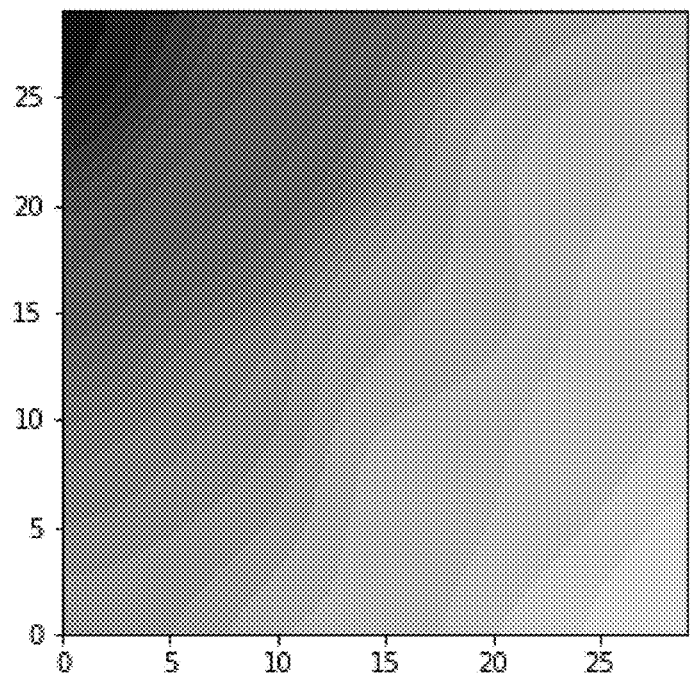
FIG. 9C is a diagram showing contour lines of rolled material temperature when the number of iterations is 10.
Figure 9D:
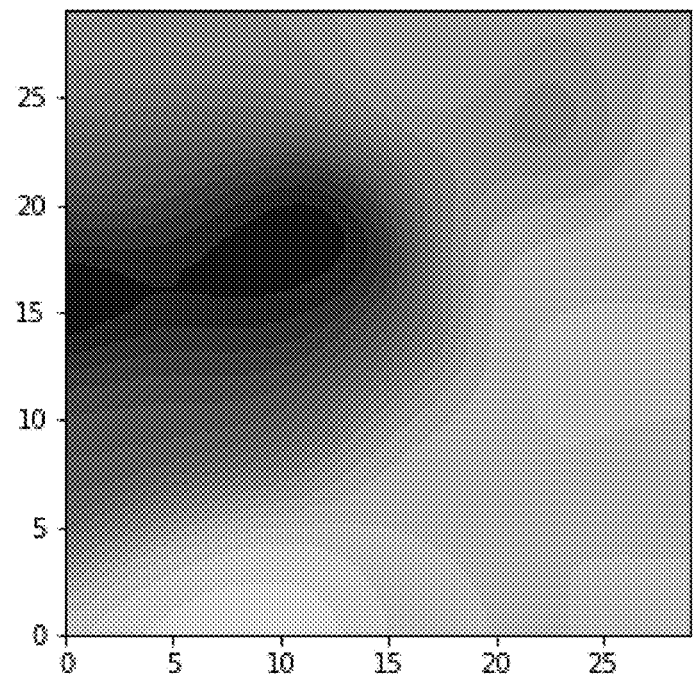
FIG. 9D is a diagram showing contour lines of rolled material temperature when the number of iterations is 20.
Figure 9E:
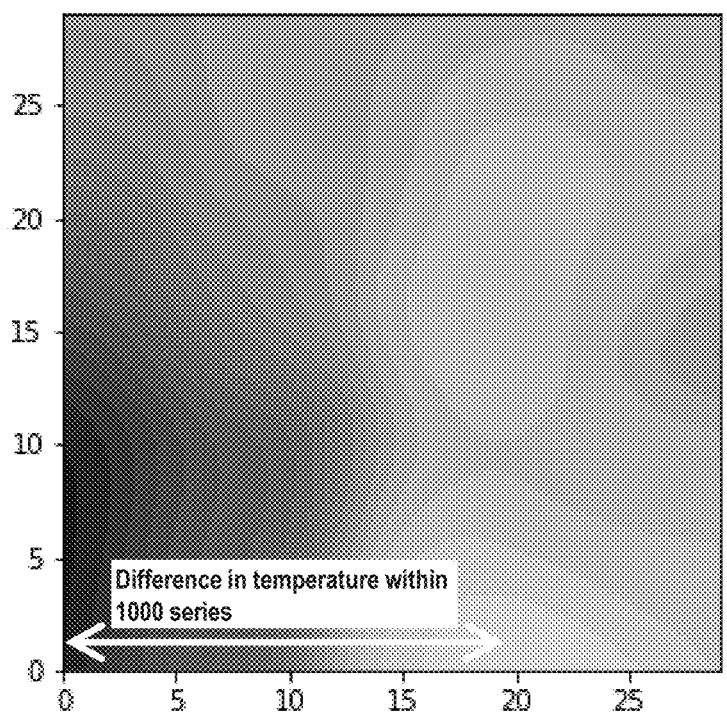
FIG. 9E is a diagram showing contour lines of rolled material temperature when the number of iterations is 40.
Figure 10A:
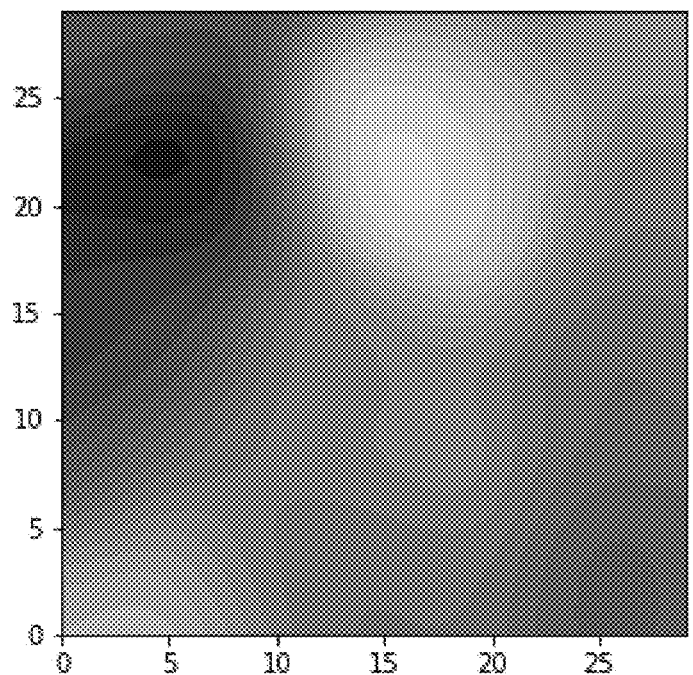
FIG. 10A is a diagram showing contour lines of log strain when the number of iterations is 0.
Figure 10B:
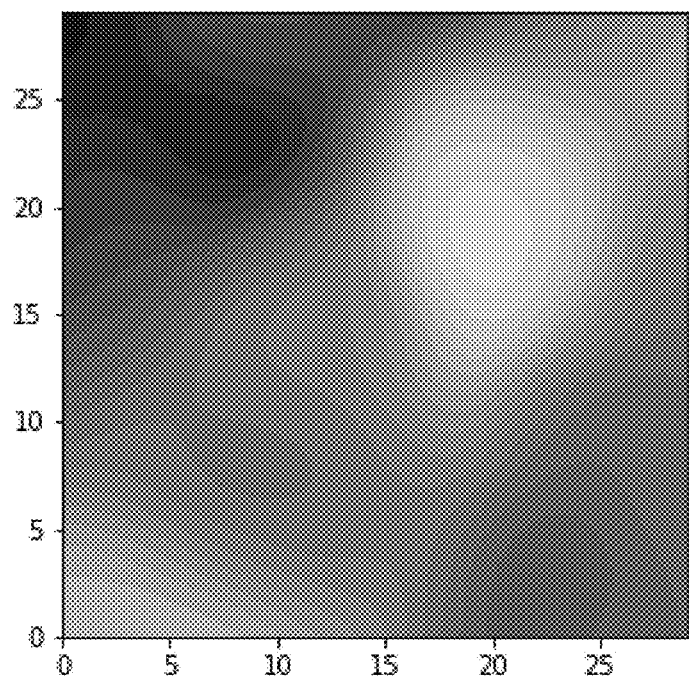
FIG. 10B is a diagram showing contour lines of log strain when the number of iterations is 5.
Figure 10C:
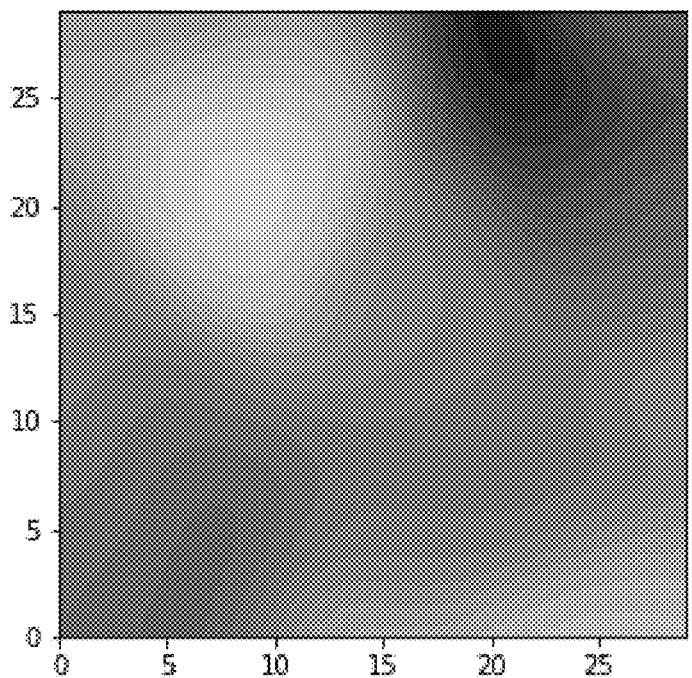
FIG. 10C is a diagram showing contour lines of log strain when the number of iterations is 10.
Figure 10D:
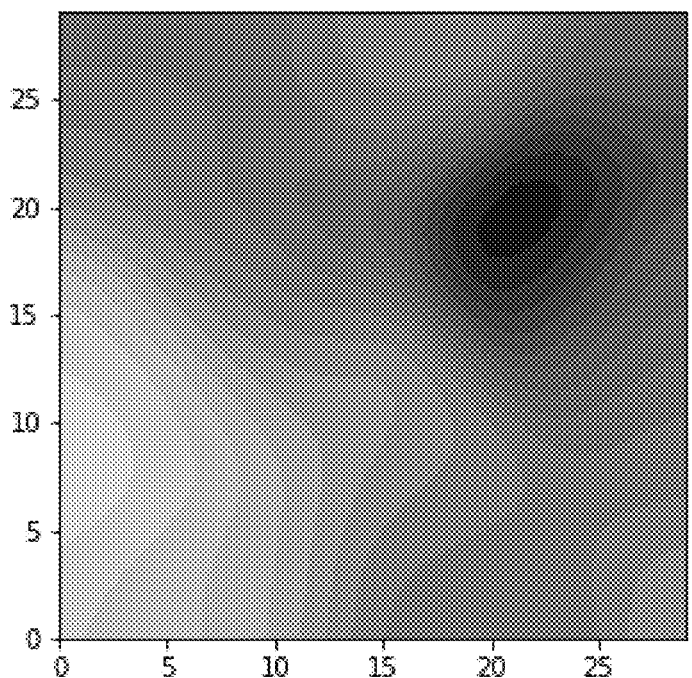
FIG. 10D is a diagram showing contour lines of log strain when the number of iterations is 20.
Figure 10E:
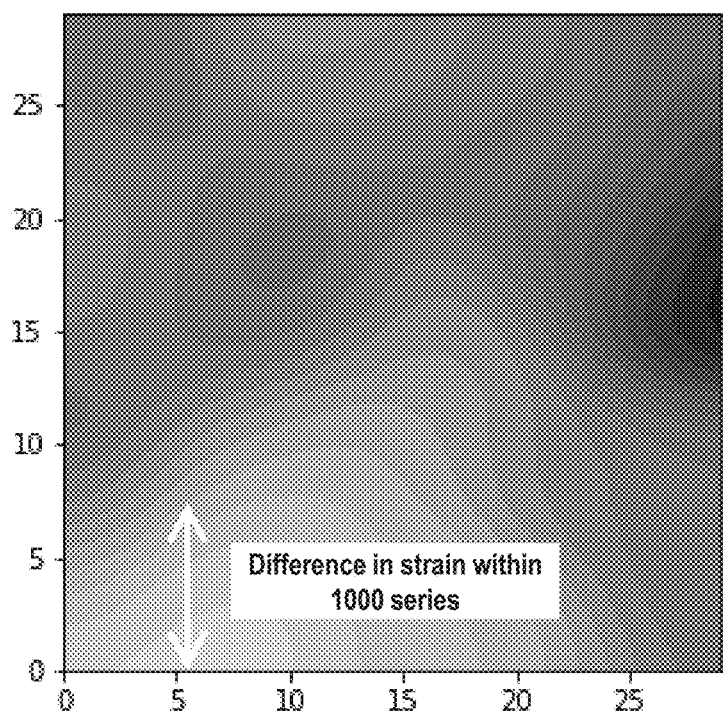
FIG. 10E is a diagram showing contour lines of log strain when the number of iterations is 40.

It can be seen that as the number of iterations increases, the positional relationship between the 1000 series and the 5000 series changes, and when the number of iterations is 40, the 1000 series and the 5000 series are arranged diagonal from each other. It can be seen that as a whole, they are also single-linked, and the same alloy species are not separated. FIG. 9E and FIG. 10E show the difference in temperature and the difference in logarithmic strain, respectively, within the 1000 series. It can be seen that the difference in temperature and the difference in logarithmic strain are clearly represented even within the same alloy. It can be seen that the present implementation example according to the present embodiment realizes an appropriate and clear alloy classification while taking into consideration of all 7 components.

The data dimensionality reduction method according to the present embodiment may further include the step of displaying on a display device an image visualizing a group of data in a dimensionally-reduced low-dimensional space. For example, the alloy classification visualization map illustrated in FIG. 8A to FIG. 8E can be displayed on the display device as a result of dimension reduction after each completion of one loop of the dimension reduction process. For example, the user can determine whether to terminate the dimension reduction process by checking the changes in the alloy classification visualization map displayed on the display device.

The present inventor applied the dimension reduction algorithm according to the present embodiment to the hot rolling process of aluminum alloy, and further attempted dimension reduction for a group of data including multiple manufacture data (or manufacture parameters) characterizing the rolled material temperature.

Figure 11:
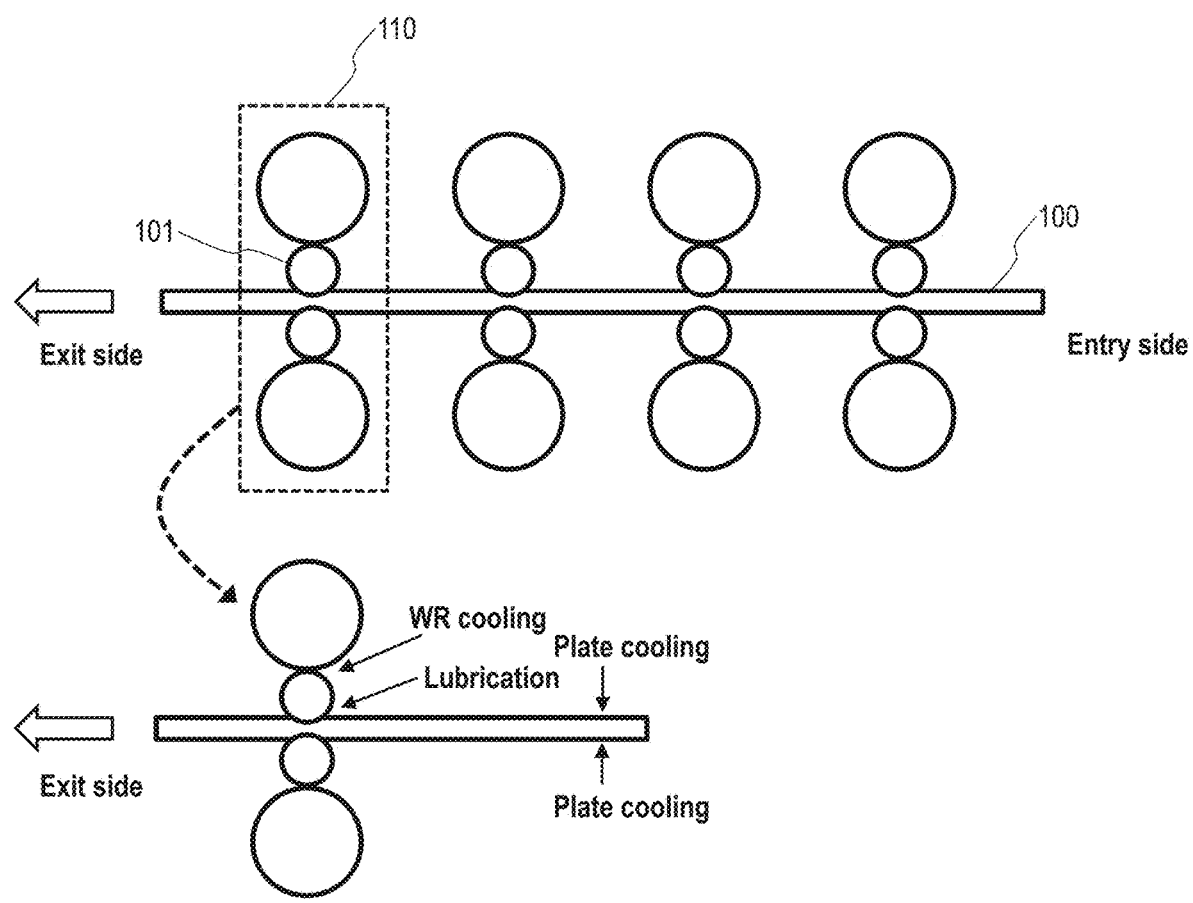
FIG. 11 is a schematic diagram showing a general configuration of a 4-stand 4-stage rolling mill used for hot finishing of aluminum alloy.

FIG. 11 is a schematic diagram showing a general configuration of a 4-stand 4-stage rolling mill used for hot finishing of aluminum alloy. In FIG. 11, the final stand is surrounded by a broken line.

A simulation was performed for an aluminum hot finish rolling mill including 4 stands 110 illustrated in FIG. 11. Possible factors causing the temperature of a rolled material (work) 100 to change include heat generation from machining or friction, cooling by air or coolant, and heat removal due to contact with work rolls (WR) 101. Note that the coolant spray mechanism includes a plate cooling spray for direct cooling of the rolled material at the stand entry side, a WR cooling spray for cooling WRs at each stand, and a lubrication spray for lubrication between the WRs and the rolled material.

Typically, a method is employed that adjusts the time of heat removal through contact with coolant and WRs by varying the rotation speed of WRs of the rolling mill to control the temperature at the exit side of the final stand, i.e., the temperature of the rolled material at the exit side of the rolling mill. Thus, it is possible to control the temperature at the exit side by varying the rotation speed of WRs.

The target of dimension reduction in this simulation is a group of data that includes multiple manufacture parameters that characterize the rolling mill temperature. Manufacture parameters that have a significant influence on the temperature and the speed calculation were selected, including: total entry-side plate coolant flow rate, total WR coolant flow rate for the first two stands, total WR coolant flow rate for the last two stands including the final stand, total lubricant flow rate for the first two stands, total lubricant flow rate for the last two stands [kl/min], entry-side temperature, exit-side temperature, coolant temperature [° C.], and exit-side thickness [mm].

In the regression model, the 9 manufacture parameters above were used as explanatory variables and the final-stand WR circumferential speed [m/s] was used as the objective variable. The linear multiple regression analysis was performed for each subspace using the regression model expressed by the formula of Expression 13.

[Expression 13]

$$WR \text{ circumferential speed (g)} = \\ b + \alpha 1 \times \text{total entry-side plate coolant flow rate} + \\ \alpha 2 \times \text{total } WR \text{ coolant flow rate for first two stands} + \ldots$$

The observed space is a 9-dimensional space, and the observed data is represented by a 9-dimensional vector. The latent space is a 2-dimensional space. The weighted Euclidean distance includes 9 weight coefficients. The linear multiple regression model is represented by 9 explanatory variables and 9 partial regression coefficients corresponding to the 9 explanatory variables. 10,000 observed data were generated based on multiple manufacture data described above that characterize the rolled material temperature included in the actual manufacture data for 10,000 coils.

Values of parameters used in the simulation and simulation conditions for the weight update algorithm were the same as those set for the deformation resistance simulation, except for $t_{min}$ (=0.4). The initial value was set to 1 for the weights of all components. The number of iterations $N_f$ was set to 40, and the weight coefficient was updated a total of 40 times according to the process procedure illustrated in FIG. 4.

Figure 12A:
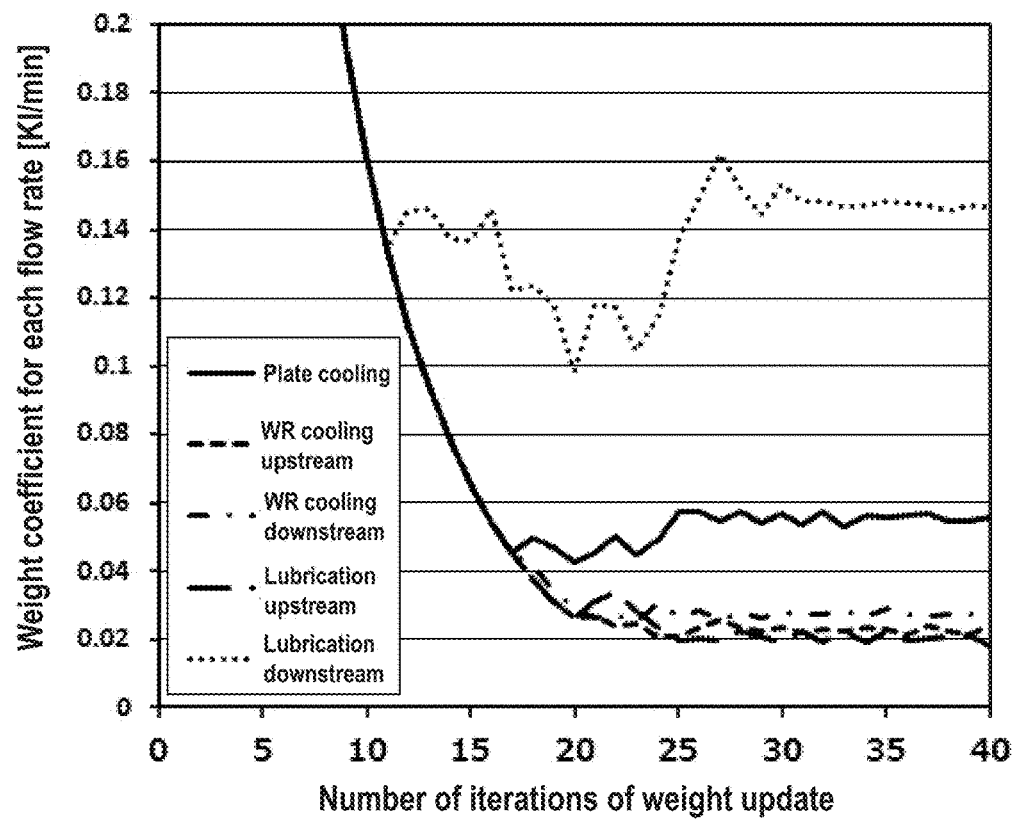
FIG. 12A is a graph showing the transition of weight coefficients of components related to the coolant flow rate versus the number of iterations of weight updates.
Figure 12B:
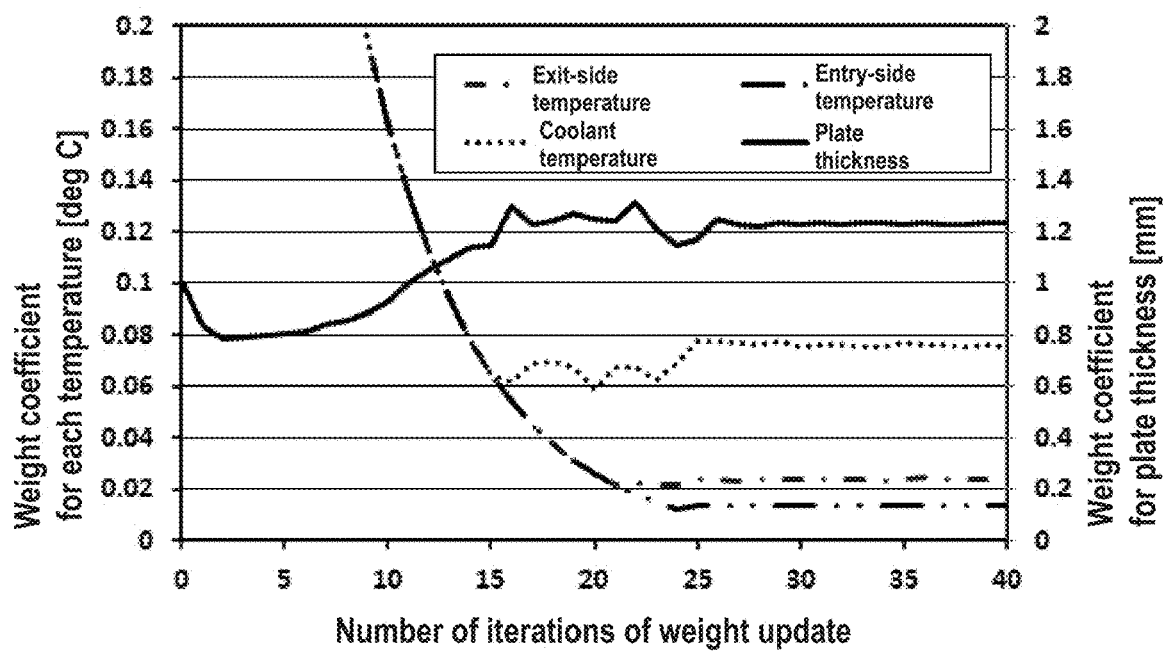
FIG. 12B is a graph showing the transition of weight coefficients of components not related to the coolant flow rate versus the number of iterations of weight updates.
Figure 12C:
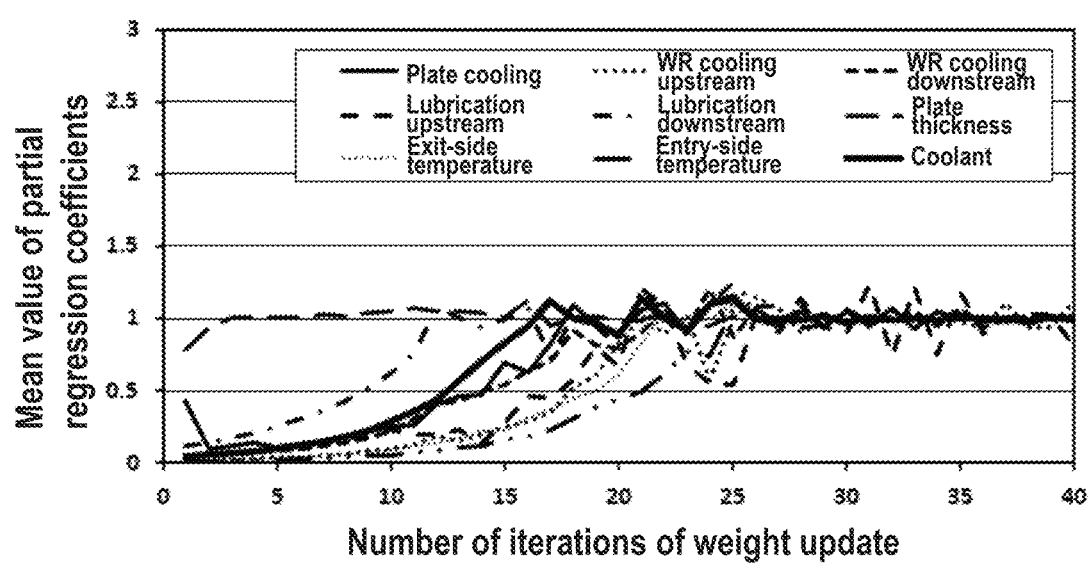
FIG. 12C is a graph showing the change in the mean value of partial regression coefficients versus the number of iterations of weight updates.

FIG. 12A is a graph showing the change in weight coefficients of components related to the coolant flow rate, i.e., the transition of weight coefficients, versus the number of iterations of weight update. FIG. 12B is a graph showing the transition of weight coefficients of components not related to the coolant flow rate versus the number of iterations of weight update. FIG. 12C is a graph showing the change in the mean value of partial regression coefficients versus the number of iterations of weight update. The horizontal axis in FIGS. 12A, 12B and 12C indicates the number of iterations of weight update. The vertical axis in FIG. 12A indicates the weight coefficient for each flow rate [kl/min]. The vertical axis on the right side of the graph in FIG. 12B shows the weight coefficient for plate thickness [mm], and the vertical axis on the left side of the graph shows the weight coefficient for each temperature [° C.]. The vertical axis in FIG. 12C shows the mean value of the partial regression coefficients for each component.

It can be seen from the results of the weight coefficient transition shown in FIGS. 12A and 12B that the weight coefficient for each component converges to a certain value after 40 iterations of weight update. From the results shown in FIG. 12A, focusing on the weight coefficient of the coolant flow rate, it can be seen that the weight coefficient of the lubricant downstream component, the weight coefficient of the entry-side plate coolant component, and the weight coefficients of other components become larger in this order. All weight coefficients, including the coolant flow rate weight coefficient, represent the degree of influence of the WR circumferential speed of the final stand. It can be seen that for the cooling of WRs, the degree of influence on the WR circumferential speed is greater on the downstream side than on the upstream side. From the results shown in FIG. 12B, focusing on the weight coefficients of components related to temperature, it can be seen that the weight coefficients of the coolant temperature, the exit-side temperature and the entry-side temperature become larger in this order. These trends are consistent with the qualitative analysis.

It can be seen from the results of the graph shown in FIG. 12C that the mean value of the partial regression coefficients varies somewhat significantly, but converges to 1 overall.

From the simulation results described above, it was found that the variance of input data does not represent the importance of the component. Introducing the data dimensionality reduction method according to the present embodiment realizes an appropriate classification by SOM by defining a distance function depending on the purpose. It is possible to apply dimension reduction, which takes into consideration the degree of influence of components on the objective variable, to completely different groups of data, such as data related to deformation resistance and data related to rolled material temperature.

INDUSTRIAL APPLICABILITY

The technology of the present disclosure is applicable to machine learning in general, and in particular, can be used in data reduction for efficient machine learning, or in visualization of data distribution.

REFERENCE SIGNS LIST

100: Rolled material (work), 101: Work roll (WR), 110: Stand, 200: Data dimensionality reduction device, 210: Input device, 220: Display device, 230: Communication I/F, 240: Storage device, 250: Processor, 260: ROM, 270: RAM, 280: Bus

The invention claimed is:

1. A method for dimensionally reducing a group of data each represented by an m-dimensional vector in an m-dimensional (m is an integer of 3 or more) high-dimensional space to an n-dimensional (n is an integer of 2 or more and less than m) low-dimensional space, the method comprising:
    a reduction step of dimensionally reducing the group of data from the high-dimensional space to the low-dimensional space using a distance function that defines a distance between any two vectors in the high-dimensional space, wherein the distance function includes p (p is an integer of m or more) first parameters;
    a division step of dividing the dimensionally-reduced low-dimensional space into multiple subspaces;
    an analysis step of performing a regression analysis using a regression model based on at least one belonging data for each divided subspace, wherein the regression model is represented as a function of m explanatory variables and q (q is an integer of m or more) second parameters corresponding to the m explanatory variables; and
    an update step of updating the p first parameters included in the distance function based on results of the regression analysis in the multiple subspaces,
    wherein the reduction step, the division step, the analysis step and the update step are repeatedly performed.

2. The method according to claim 1, wherein in the reduction step, a self-organizing map is applied to the dimension reduction.

3. The method according to claim 1, wherein:
    the distance function is represented by a weighted Euclidean distance, where the integer p is equal to the integer m; and
    the p first parameters are m weight coefficients that weigh a distance between m components between the any two vectors.

4. The method according to claim 1, wherein the regression model is a linear multiple regression model.

5. The method according to claim 4, wherein:
the q second parameters are m partial regression coefficients, where the integer q is equal to the integer m;
an update parameter is calculated based on absolute values of the m partial regression coefficients obtained from a linear multiple regression analysis performed in the analysis step for each divided subspace; and
in the update step, the p first parameters are updated using the update parameter.

6. The method according to claim 1, wherein the low-dimensional space is a 2-dimensional space.

7. The method according to claim 1, comprising an initialization step of initializing the p first parameters.

8. The method according to claim 1, comprising a display step of displaying on a display device an image visualizing a group of data in the dimensionally-reduced low-dimensional space.

9. The method according to claim 1, wherein the m-dimensional vector includes, as its components, a chemical composition and/or manufacturing conditions of an alloy material.

10. The method according to claim 9, wherein the manufacturing conditions include manufacturing conditions associated with a rolled material of an aluminum alloy.

11. A computer program, stored on a non-transitory computer readable storage medium, used for dimensionally reducing a group of data each represented by an m-dimensional vector in an m-dimensional (m is an integer of 3 or more) high-dimensional space to an n-dimensional (n is an integer of 2 or more and less than m) low-dimensional space, the computer program causing a computer to perform:
a reduction step of dimensionally reducing the group of data from the high-dimensional space to the low-dimensional space using a distance function that defines a distance between any two vectors in the high-dimensional space, wherein the distance function includes p (p is an integer of m or more) first parameters;
a division step of dividing the dimensionally-reduced low-dimensional space into multiple subspaces;
an analysis step of performing a regression analysis using a regression model based on at least one belonging data for each divided subspace, wherein the regression model is represented as a function of m explanatory variables and q (q is an integer of m or more) second parameters corresponding to the m explanatory variables; and
an update step of updating the p first parameters included in the distance function based on results of the regression analysis in the multiple subspaces,
wherein the computer program causes the computer to repeatedly perform the reduction step, the division step, the analysis step and the update step in this order.

12. A data dimensionality reduction device for dimensionally reducing a group of data each represented by an m-dimensional vector in an m-dimensional (m is an integer of 3 or more) high-dimensional space to an n-dimensional (n is an integer of 2 or more and less than m) low-dimensional space, the data dimensionality reduction device comprising:
a processor; and
a memory storing a program for controlling an operation of the processor, the processor performing, according to the program:
a reduction step of dimensionally reducing the group of data from the high-dimensional space to the low-dimensional space using a distance function that defines a distance between any two vectors in the high-dimensional space, wherein the distance function includes p (p is an integer of m or more) first parameters;
a division step of dividing the dimensionally-reduced low-dimensional space into multiple subspaces;
an analysis step of performing a regression analysis using a regression model based on at least one belonging data for each divided subspace, wherein the regression model is represented as a function of m explanatory variables and q (q is an integer of m or more) second parameters corresponding to the m explanatory variables; and
an update step of updating the p first parameters included in the distance function based on results of the regression analysis in the multiple subspaces,
wherein the processor repeatedly performs the reduction step, the division step, the analysis step and the update step in this order.

* * * * *